United States Patent
Miyakawa

(10) Patent No.: US 12,155,800 B2
(45) Date of Patent: Nov. 26, 2024

(54) DOCUMENT READING APPARATUS AND IMAGE FORMING APPARATUS INCLUDING HINGE MECHANISM THAT SUPPORTS A DOCUMENT CONVEYANCE UNIT

(71) Applicant: CANON KABUSHIKI KAISHA, Tokyo (JP)

(72) Inventor: Riki Miyakawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/346,928

(22) Filed: Jul. 5, 2023

(65) Prior Publication Data

US 2024/0015254 A1 Jan. 11, 2024

(30) Foreign Application Priority Data

Jul. 8, 2022 (JP) .................................. 2022-110606

(51) Int. Cl.
*H04N 1/00* (2006.01)
*H04N 1/12* (2006.01)

(52) U.S. Cl.
CPC ....... *H04N 1/00554* (2013.01); *H04N 1/1235* (2013.01)

(58) Field of Classification Search
CPC ......................... H04N 1/00554; H04N 1/1235
See application file for complete search history.

(56) References Cited

U.S. PATENT DOCUMENTS

| 2003/0117673 A1* | 6/2003 | Yamanaka | H04N 1/00551 358/474 |
| 2005/0025541 A1* | 2/2005 | Terae | H04N 1/10 399/380 |
| 2005/0044664 A1* | 3/2005 | Chang | H04N 1/00543 16/327 |
| 2007/0251056 A1* | 11/2007 | Aoyagi | H04N 1/00519 16/221 |
| 2009/0109504 A1* | 4/2009 | Hirokawa | H04N 1/00557 358/498 |
| 2017/0070626 A1* | 3/2017 | Ikeda | H04N 1/00554 |
| 2018/0347247 A1* | 12/2018 | Kondo | E05F 1/1253 |
| 2019/0170181 A1* | 6/2019 | Hino | F16B 39/24 |
| 2019/0203516 A1* | 7/2019 | Fang | E05F 3/20 |
| 2019/0265629 A1* | 8/2019 | Kawanishi | G03G 15/605 |

(Continued)

FOREIGN PATENT DOCUMENTS

JP 3917097 B2 5/2007
JP 5640303 B2 12/2014

*Primary Examiner* — Nicholas Pachol
(74) *Attorney, Agent, or Firm* — ROSSI, KIMMS & McDOWELL LLP

(57) ABSTRACT

A document reading apparatus includes an image reading unit, a document conveyance unit, and a hinge mechanism. The document conveyance unit includes a first abutment portion and a second abutment portion. The document conveyance unit includes a first abutment portion and a second abutment portion. The hinge mechanism includes a first member, a first shaft, a second member, a second shaft, a third member, a third shaft, a fourth member, a first urging portion, a second urging portion. The fourth member has a first pair of side plates supported by the third shaft. The second spring is disposed outside the first pair of side plates in an axial direction of the third shaft.

8 Claims, 9 Drawing Sheets

(56) References Cited

U.S. PATENT DOCUMENTS

2019/0302675 A1* 10/2019 Nishizawa ............. G03G 15/60
2023/0064679 A1*  3/2023 Ogawa ................ H05K 5/0226
2023/0079992 A1*  3/2023 Ogawa .................... F16C 11/04
                                                    312/319.2

* cited by examiner

DOCUMENT READING APPARATUS AND IMAGE FORMING APPARATUS INCLUDING HINGE MECHANISM THAT SUPPORTS A DOCUMENT CONVEYANCE UNIT

BACKGROUND OF THE INVENTION

Field of the Invention

The present invention relates to a document reading apparatus that includes a hinge mechanism that supports a document conveyance unit such that the document conveyance unit can be opened and closed with respect to a document reading unit, and to an image forming apparatus.

Description of the Related Art

Some of image forming apparatuses, such as copying machines, facsimiles, and multi-function printers, include a document reading apparatus disposed in an upper portion thereof, for reading a document. The document reading apparatus may include an image reading unit that reads an image on a document, and a document conveyance unit (hereinafter referred to as an ADF) that automatically conveys the document toward the document reading unit. In general, such a document reading apparatus can execute so-called fixed-document reading and feeding-document reading. In the fixed-document reading, the document reading apparatus reads an image on a document fixed to a fixed-document reading glass of the document reading unit. In the feeding-document reading, the document reading apparatus reads an image on a document conveyed from the ADF and passing across a feeding-document reading glass. Thus, the ADF is supported by a hinge mechanism with respect to the document reading unit, and can be opened and closed with respect to the document reading unit.

Preferably, when the ADF is closed with respect to the document reading unit, a pressing plate that presses a document against the fixed-document reading glass, or abutment portions that abut on both end portions of the feeding-document reading glass in a width direction of the feeding-document reading glass and that form a conveyance channel of the document are pressed against the surface of the fixed-document reading glass or the feeding-document reading glass so as to be parallel with the surface. In addition, in the fixed-document reading, if a thick document, such as a book, is set on the fixed-document reading glass, it is desired to secure a certain distance between the closed ADF and the fixed-document reading glass. Japanese Patent No. 3917097 proposes a hinge mechanism that includes three pivot fulcrums and four members. The four members are pivoted relative to each other, on the three pivot fulcrums. Specifically, in the configuration proposed by Japanese Patent No. 3917097, a fixed-end member (32) is fixed to a document reading unit, and a fixed-end member (33) pivots on a fulcrum (f1) with respect to the fixed-end member (32), so that the whole of an ADF is opened and closed with respect to the document reading unit. In addition, a pivot-end member (34) pivots on a fulcrum (f2) with respect to the fixed-end member (33), so that a certain distance between the ADF and the fixed-document reading glass is secured for a thick document. Furthermore, an upper stay (43) pivots on a fulcrum (f3) with respect to the pivot-end member (34), so that the parallelism between the ADF and the document reading unit can be adjusted in a state where the ADF is closed with respect to the document reading unit.

Since the ADF is relatively heavy in weight, Japanese Patent No. 5640303 proposes a configuration in which the torque is applied when an ADF is opened and closed with respect to a document reading unit. Specifically, the torque is applied in an open/close direction by using springs (54, 55). The springs apply a large torque, against the self-weight of the ADF, in a direction in which the ADF is opened, so that the operability for opening and closing the ADF can be increased.

By the way, for reducing the weight and cost of the ADF, the use of resin or a thin metal component has been studied for making the frame of the ADF. However, the use of such a material or component tends to decrease the stiffness of the ADF. If the stiffness of the ADF decreases, an edge portion of the ADF opposite to the hinge mechanism (i.e., an edge portion of the ADF on the front side of the image forming apparatus) will bend down and abut on the image reading unit when the ADF is closed with respect to the image reading unit. In this case, if the springs, as described above and used for applying the torque in the direction in which the ADF is opened and closed, are disposed, the torque is produced in a direction in which a back portion of the ADF (i.e., a portion of the ADF near to the hinge) is lifted up by urging force of the springs. Thus, the parallelism of the ADF cannot be kept in such a configuration alone.

In the ADF described in Japanese Patent No. 5640303, an adjustment screw (44) is provided for adjusting the parallelism in a state where the ADF is closed. However, in the ADF in which the parallelism is adjusted with such an adjustment screw, the adjustment will be required every time the ADF deforms due to the change over the years or the change in environmental temperature.

For this reason, springs used for equalization (hereinafter, the adjustment of parallelism is referred to as equalization) may be provided. The springs adjust the parallelism by urging the back portion of the ADF toward the image reading unit (i.e., downward). As a result, even if the ADF has low stiffness and bends, and the springs for applying the torque exert the force in a direction in which the back portion of the ADF is lifted up, the equalization is automatically performed by the springs for the equalization pressing the back portion of the ADF against the image reading unit.

However, since the springs for applying the torque against the above-described self-weight of the ADF has large urging force, the springs for the equalization, which press the back portion of the ADF downward, are required to have a certain level of urging force. If the springs for the equalization is disposed on a top portion of the hinge mechanism for exerting the urging force downward, the size of the hinge mechanism will be increased in the up-and-down direction.

An object of the present invention is to provide a document reading apparatus whose hinge mechanism can be made compact in the up-and-down direction, and is to provide an image forming apparatus.

SUMMARY OF THE INVENTION

According to a first aspect of the present invention, a document reading apparatus includes an image reading unit including a transparent member configured to transmit light, and a reading portion configured to read an image on a document via the transparent member, a document conveyance unit configured to convey a document such that the document passes across a surface of the transparent member, and a hinge mechanism configured to support the document conveyance unit such that the document conveyance unit is able to be opened and closed with respect to the image reading unit. The document conveyance unit includes a first abutment portion configured to abut on the image reading unit, and a second abutment portion disposed at a position closer to the hinge mechanism than the first abutment portion in a width direction orthogonal to a conveyance direction of a document, and configured to abut on the image reading unit. The hinge mechanism includes a first member fixed to the image reading unit, a first shaft supported by the first member, a second member configured to rotate on the first shaft with respect to the first member, a second shaft disposed at a position different from a position of the first shaft and parallel to the first shaft, and supported by the second member, a third member configured to rotate on the second shaft with respect to the second member, the third member including a first pair of side plates and a first top plate connected to the first pair of side plates at a top side of the first pair of side plates, a third member configured to rotate on the second shaft with respect to the second member, a third shaft disposed at a position different from the position of the second shaft and parallel to the second shaft, and supported by the first pair of side plates, a fourth member to which the document conveyance unit is fixed, and which is configured to rotate on the third shaft with respect to the third member such that the first abutment portion and the second abutment portion abut on the image reading unit, the fourth member including a second pair of side plates and a second top plate connected to the second pair of side plates at a top side of the second pair of side plates and the fourth member being disposed such that the second top plate is positioned above the first top plate, a first urging portion that includes a first spring configured to apply torque in a direction in which the document conveyance unit is opened, in accordance with a pivot angle of the document conveyance unit with respect to the image reading unit, and a second urging portion that includes a second spring configured to apply torque to the fourth member such that the second abutment portion abuts on the image reading unit. The second spring is disposed outside the first second pair of side plates in an axial direction of the third shaft, below the first top plate, and above a lower edge of the second pair of side plates in a state where the document conveyance unit is closed with respect to the image reading unit.

According to a second aspect of the present invention, an image forming apparatus includes the document reading apparatus, and an image forming portion configured to form an image that is read by the document reading apparatus on a sheet.

Further features of the present invention will become apparent from the following description of exemplary embodiments with reference to the attached drawings.

DESCRIPTION OF THE EMBODIMENTS

Overall Configuration

Figure 1A:
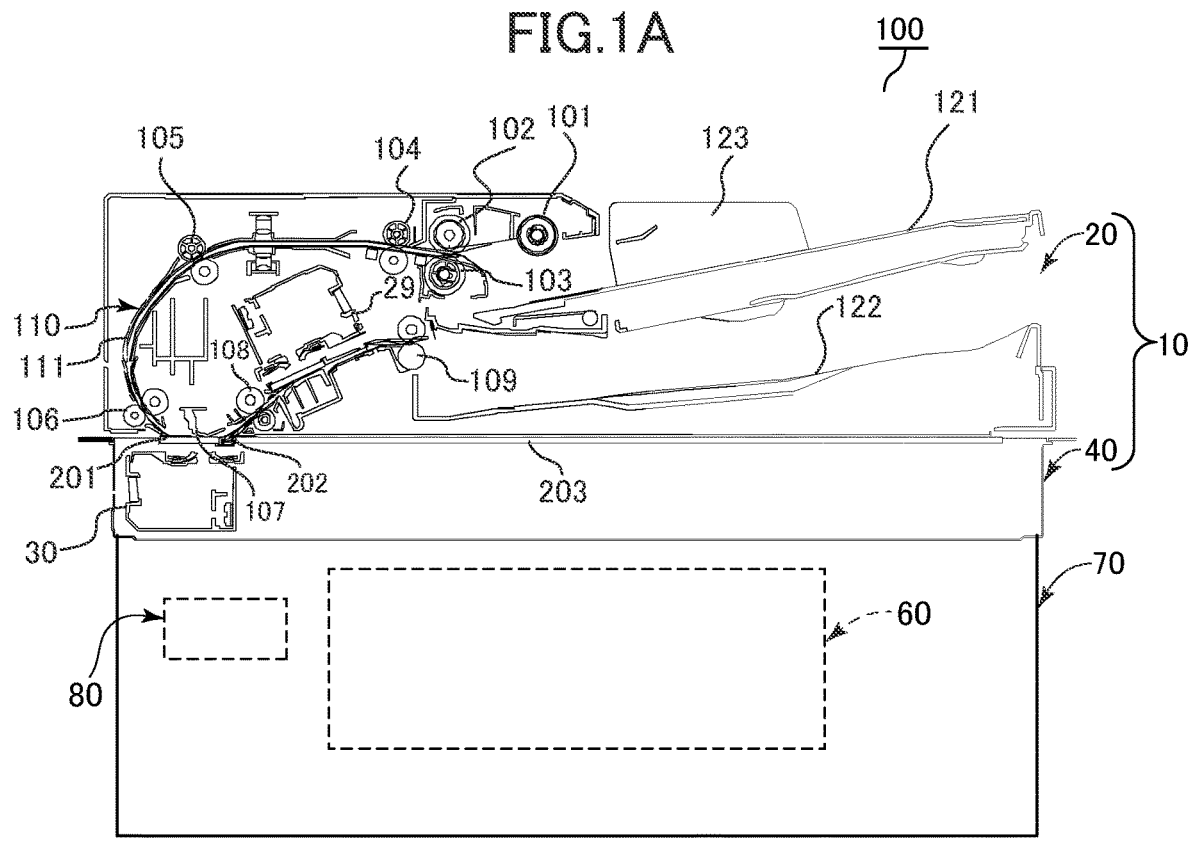
FIG. 1A is an overall schematic diagram of a printer of the present embodiment.

Hereinafter, the present embodiment will be described with reference to the accompanying drawings. A printer 100 of the present embodiment, which serves as an image forming apparatus, is an electrophotographic laser-beam printer. As illustrated in FIG. 1A, the printer 100 includes a printer body 70 and a document reading apparatus 10 attached to a top portion of the printer body 70. In the following description, a sheet may be a plain paper sheet, a thick paper sheet, a specialized paper sheet such as a coated paper sheet, a recording material, such as an envelope or an index paper sheet, which has a specialized shape, a plastic film used for overhead projectors, or a cloth sheet. A document is also one example of the sheet.

Figure 1B:
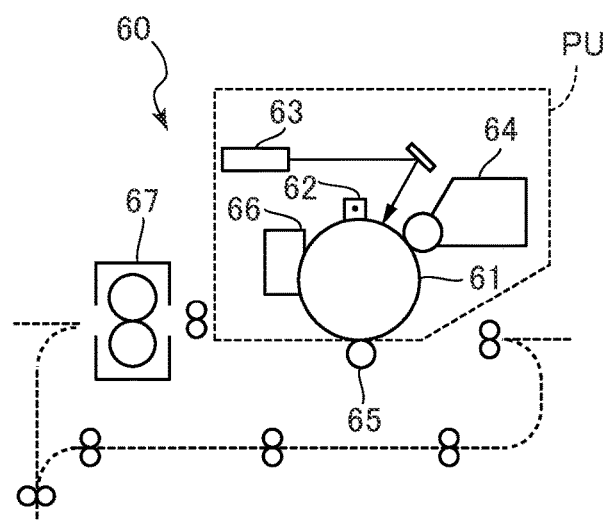
FIG. 1B is a schematic diagram illustrating an image forming engine of a printer of the present embodiment.

The printer body 70 contains an image forming engine 60, which serves as an image forming portion. As illustrated in FIG. 1B, the image forming engine 60 includes an electrophotographic image forming unit PU and a fixing apparatus 67. When the start of an image forming operation is instructed, a photosensitive drum 61, which is a photosensitive member, is rotated, and the surface of the photosensitive drum 61 is uniformly charged by a charging apparatus 62. Then an exposure apparatus 63 modulates a laser beam in accordance with image data, sent by the document reading apparatus 10 or an external computer; outputs the modulated laser beam; and forms an electrostatic latent image on the surface of the photosensitive drum 61 by scanning the surface. The electrostatic latent image is visualized (developed) into a toner image, with toner supplied from a developing apparatus 64.

In parallel with such an image forming operation, a feeding operation is performed for feeding a sheet stacked on a cassette or a manual feed tray (both not illustrated) toward the image forming engine 60. The sheet fed in this manner is conveyed in synchronization with the image formation operation performed by the image forming unit PU. The toner image borne by the photosensitive drum 61 is transferred to the sheet by a transfer roller 65. The toner left on the photosensitive drum 61 after the toner image is transferred is collected by a cleaning apparatus 66. The sheet to which the toner image has been transferred (the toner image is still not fixed to the sheet) is delivered to the fixing apparatus 67, and heated and pressed while nipped by a roller pair. The toner is melted and solidifies, so that the toner image is fixed to the sheet. The sheet is then discharged by a discharging roller pair.

Document Reading Apparatus

Next, the document reading apparatus 10 will be described in detail. As illustrated in FIG. 1A, the document reading apparatus 10 includes an automatic document conveyance apparatus (ADF) 20 and an image reading unit 40. The ADF 20 feeds a document stacked on a document tray 121 and discharges the document to a discharging tray 122. The image reading unit 40 reads the document conveyed by the ADF 20. That is, the ADF 20 conveys a sheet, which serves as a document, to the image reading unit 40. The image reading unit 40 includes a reading portion 30 that reads an image on a surface of a document. As described in detail below, the ADF 20 is supported by a hinge mechanism 3 (see FIG. 2) such that the ADF 20 can pivot or rotate with respect to the image reading unit 40 for opening a platen glass 201 and a document platen glass 203. The platen glass 201 and the document platen glass 203 serve as transparent members that transmit light. Note that the document, which is one example of a sheet, may be a blank sheet or another sheet on which an image is formed on one side or both sides.

The ADF 20 includes a pickup roller 101; a separation driving roller 102 and a separation driven roller 103 that constitute a separation roller pair; a registration roller pair 104; conveyance roller pairs 105, 106, and 108; and a discharging roller pair 109. In addition, the ADF 20 includes a reading portion 29 that reads an image on a back side of a document.

The image reading unit 40 includes the platen glass 201, a jump ramp 202, the document platen glass 203, and the reading portion 30 that reads an image on a surface of a document.

The document reading apparatus 10 reads an image on a document in the flowing-document reading mode or the fixed-document reading mode. In the flowing-document reading mode, a document is placed on the document tray 121, and the document reading apparatus 10 scans the image on the document while causing the ADF 20 to feed the document. In the fixed-document reading mode, the document reading apparatus 10 scans a document placed on the document platen glass 203. The flowing-document reading mode is selected when a document sensor (not illustrated) detects a document placed on the document tray 121, or when a user explicitly selects the flowing-document reading mode by using, for example, an operation panel of the printer body 70.

If the feeding-document reading mode is executed, the pickup roller 101 moves down, and abuts on an uppermost document that is set on the document tray 121. Then the document is fed by the pickup roller 101, and separated from other documents, one by one, in a separation nip formed by the separation driving roller 102 and the separation driven roller 103. A rotary-member support structure of the separation driven roller 103 is provided with a torque limiter. Thus, when a single document is fed, the separation driven roller 103 rotates with the separation driving roller 102; when two or more documents are fed, the separation driven roller 103 does not rotate. In this manner, a document can be separated from other documents, one by one. Note that the separation driven roller 103 may be applied with a driving force in a direction opposite to the sheet feeding direction.

The leading edge of the document, conveyed as described above, abuts on the registration roller pair 104 that is in a stop state, so that the skew of the document is corrected. After the skew of the document is corrected, the document is conveyed by the registration roller pair 104, and further conveyed by the conveyance roller pairs 105, 106, and 108 so that the document passes across the surface of the platen glass 201. After that, the document is conveyed so as to pass through a reading position of the reading portion 29. A platen guide 107 is disposed so as to face the platen glass 201; and guides a document that passes across the platen glass 201, so that the document does not rise from the platen glass 201.

An image on a front surface of a document is read by the reading portion 30 through the platen glass 201, and an image on a back surface of a document is read by the reading portion 29. The image is subjected to photoelectric conversion performed by a line sensor of the reading portion 29 or 30, and the image information obtained in this manner is sent to a control portion 80 (see FIG. 1A). The document that has passed across the platen glass 201 is guided to the conveyance roller pair 108 by the jump ramp 202, then passes through the reading portion 29, and then is discharged to the discharging tray 122 by the discharging roller pair 109.

On the other hand, the fixed-document reading mode is selected when the apparatus detects a document placed on the document platen glass 203, or when a user explicitly selects the fixed-document reading mode by using, for example, an operation panel of the printer body 70. In this case, the document on the document platen glass 203 does not move, and the reading portion 30 scans the document while moving along the document platen glass 203. Similarly, the image is subjected to photoelectric conversion performed by a line sensor of the reading portion 30, and the image information obtained in this manner is sent to the control portion 80 (see FIG. 1A).

Positional Relationship Between ADF and Image Reading Unit

Figure 2:
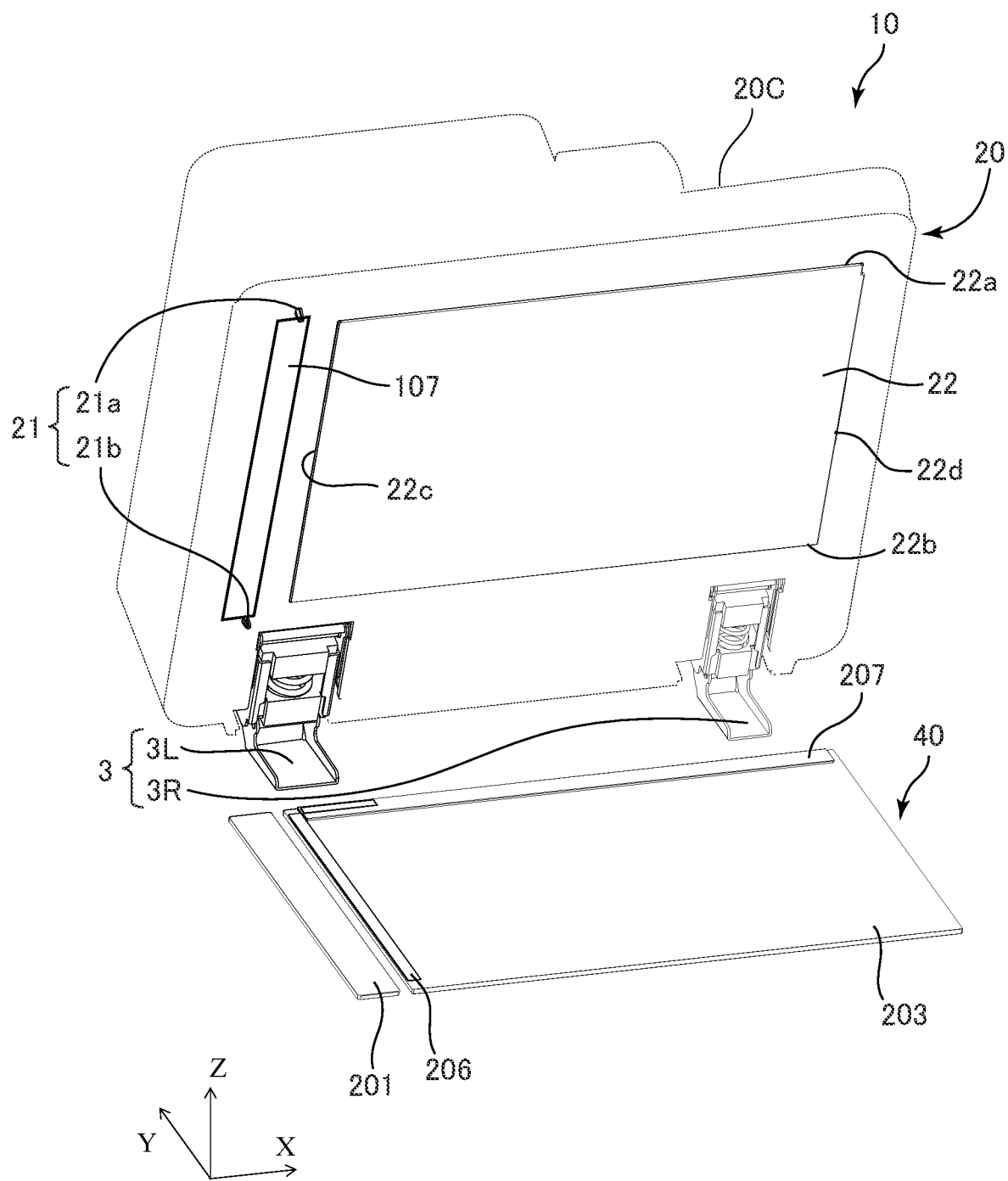
FIG. 2 is a perspective view illustrating a document reading apparatus that is in a state where an ADF of the present embodiment is opened.

Next, arrangement of the hinge mechanism 3, an abutment portion 21, and a pressing plate 22 will be described with reference to FIG. 2. Each of the abutment portion 21 and the pressing plate 22 serves as an abutment portion that abuts on the image reading unit 40 when the ADF 20 is closed. FIG. 2 is a perspective view illustrating the document reading apparatus that is in a state where the ADF 20 of the present embodiment is opened.

As illustrated in FIG. 2, in the document reading apparatus 10 of the present embodiment, a right hinge mechanism 3R and a left hinge mechanism 3L (hereinafter referred collectively as to the hinge mechanism 3 if it is not necessary to distinguish the hinge mechanisms 3R and 3L from each other) are disposed on the image reading unit 40, and supports the ADF 20 such that the ADF 20 can be opened and closed. The right and left hinge mechanisms 3R and 3L are disposed on the image reading unit 40, at two positions different from each other in an X direction that is the right-and-left direction of the printer 100. Note that the right and left hinge mechanisms 3R and 3L are designed so as to have different sizes in accordance with the difference in weight between a right portion and a left portion of the ADF 20 in the right-and-left direction.

The abutment portion 21 includes an abutment portion 21a that serves as a first abutment portion, and that abuts on a front end portion of the platen glass 201 when the ADF 20 is closed. The front end portion is a portion of the platen glass 201 in a Y direction that is the front-and-back direction of the printer 100. In addition, the abutment portion 21 includes an abutment portion 21b that serves as a second abutment portion, and that abuts on a back end portion of the platen glass 201 when the ADF 20 is closed. The back end portion is a portion of the platen glass 201 in the Y direction that is the front-and-back direction of the printer 100. The abutment portion 21a is disposed farther from the hinge mechanism 3 in a width direction orthogonal to the sheet conveyance direction, than an area of the sheet conveyance path (along which the sheet is conveyed) is. In contrast, the abutment portion 21b is disposed closer to the hinge mechanism 3 in the width direction, than the area of the sheet conveyance path (along which the sheet is conveyed) is. In the above-described feeding-document reading mode, the abutment portions 21a and 21b are in contact with both end portions of the platen glass 201, so that a conveyance channel, through which a document passes, is formed by the platen glass 201, the jump ramp 202 (see FIG. 1A), and the platen guide 107.

That is, the platen glass 201 and the jump ramp 202, together with the platen guide 107 of the ADF 20, constitute one portion of a conveyance guide that guides a document. Note that although other conveyance guides that guide a document in the ADF 20 are disposed in the ADF 20, the platen glass 201 and the jump ramp 202 are components of the image reading unit 40. Thus, in a state where the abutment portions 21a and 21b are in contact with both end portions of the platen glass 201, the relative position between the image reading unit 40 and the ADF 20 is kept properly, and the consistency, that is a positional relationship, between the conveyance path on the platen glass 201 and other conveyance paths in the ADF 20 is kept.

Note that the abutment portions 21a and 21b may abut on a frame portion 205 (see FIG. 3A) that surrounds the platen glass 201. That is, due to the component tolerance or the adjustment (equalization) of the parallelism as described in detail below, there is a case in which the abutment portions 21a and 21b abut on the frame portion 205. Even in this case, since the surface of the frame portion 205 is substantially flush with the surface of the platen glass 201, the abutment of the abutment portions 21a and 21b against the frame portion 205 produces the same effect as that produced by the abutment of the abutment portions 21a and 21b against the surface of the platen glass 201. That is, even if the abutment portions 21a and 21b abut on the frame portion 205, the relative position between the image reading unit 40 and the ADF 20 is kept properly, and the consistency between the conveyance path on the platen glass 201 and other conveyance paths in the ADF 20 is kept.

In addition, the ADF 20 includes the pressing plate 22, which is pressed against the document platen glass 203 when the ADF 20 is closed. The pressing plate 22 is formed in a rectangle that includes a front side 22a that is positioned on the front side of the printer 100, a back side 22b that is positioned on the back side of the printer 100, a left side 22c that is positioned on the left side of the printer 100, and a right side 22d that is positioned on the right side of the printer 100. The document platen glass 203 includes a longitudinal-size indicator 206 and a lateral-size indicator 207, each of which is provided with an indicator that indicates the size of a document that is set on the document platen glass 203. The pressing plate 22 is disposed such that when the ADF 20 is closed, the left side 22c does not overlap with the longitudinal-size indicator 206 and is located closer to the longitudinal-size indicator 206 with a gap formed as small as possible, and that when the ADF 20 is closed, the back side 22b does not overlap with the lateral-size indicator 207 and is located closer to the lateral-size indicator 207 with a gap formed as small as possible. Note that when the abutment of the abutment portion 21b is adjusted in the equalization that will be described in detail below, the adjustment is performed such that the back side 22b becomes closer to the lateral-size indicator 207.

Configuration of Hinge Mechanism

Figure 4:
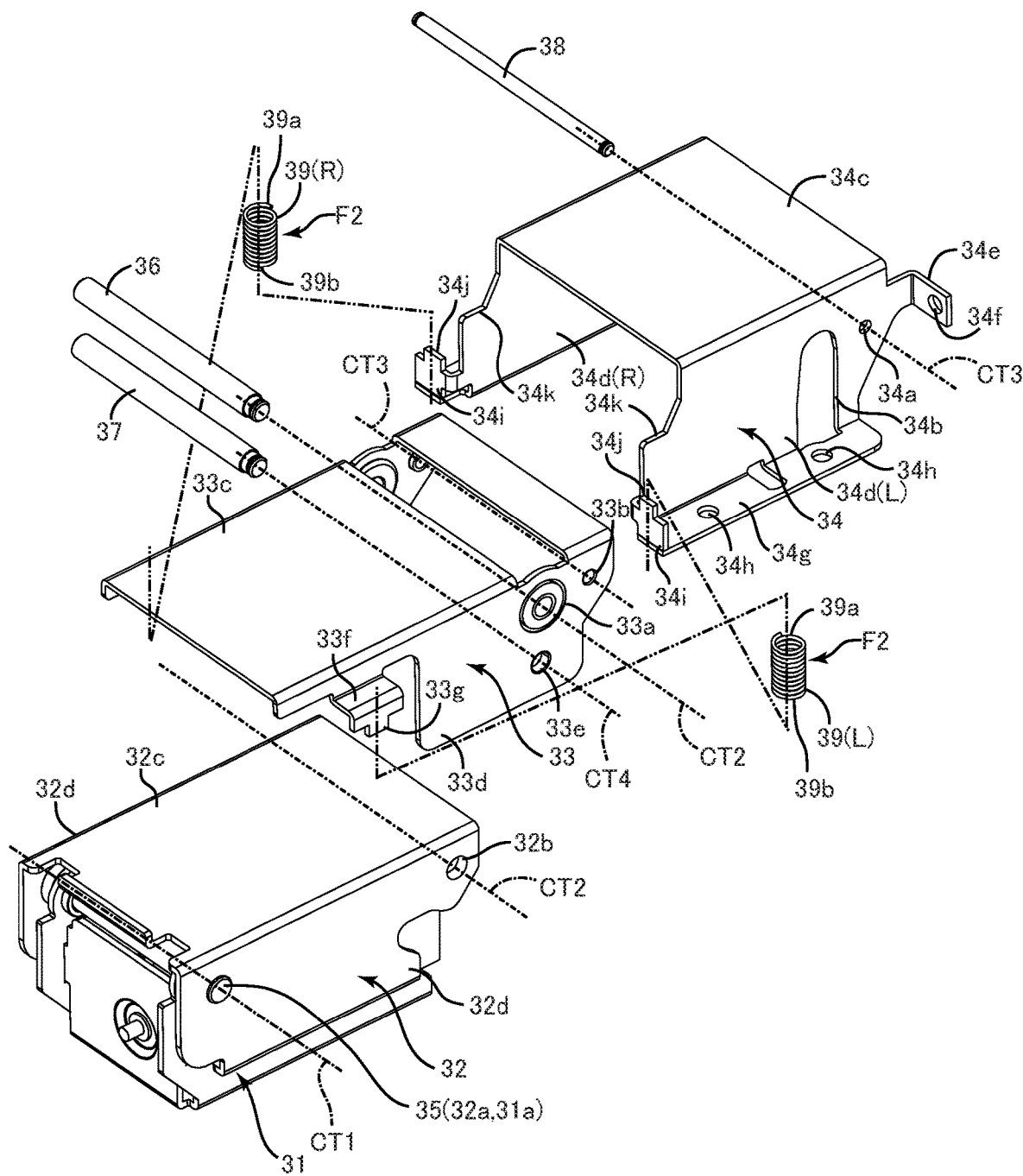
FIG. 4 is an exploded perspective view illustrating a hinge mechanism of the present embodiment.
Figure 5:
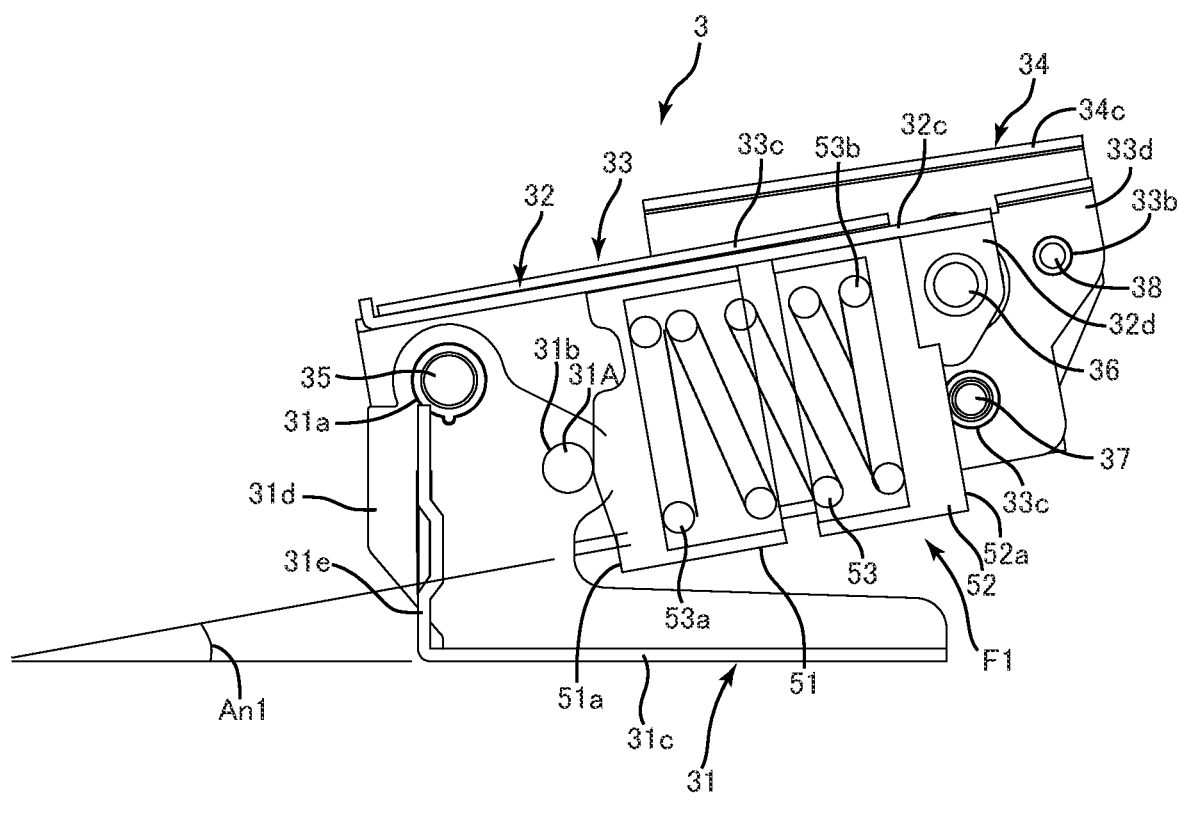
FIG. 5 is a cross-sectional view illustrating the hinge mechanism of the present embodiment.
Figure 6:
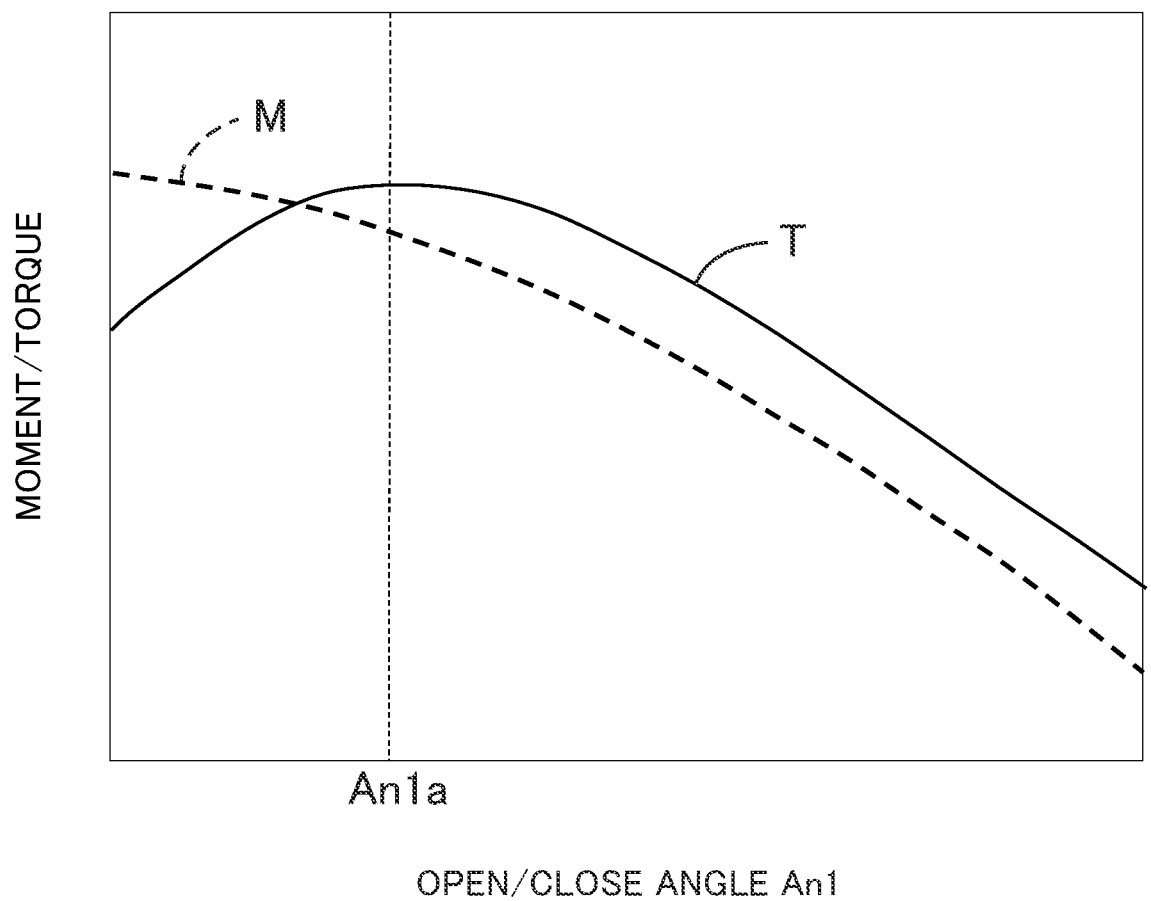
FIG. 6 is a diagram illustrating a relationship between the open/close angle and the moment applied by the hinge mechanism of the present embodiment, and a relationship between the open/close angle and the torque applied by the hinge mechanism of the present embodiment.

Next, a configuration of the hinge mechanism 3 of the present embodiment will be described with reference to FIGS. 4 to 6. FIG. 4 is an exploded perspective view illustrating the hinge mechanism of the present embodiment. FIG. 5 is a cross-sectional view illustrating the hinge mechanism of the present embodiment. FIG. 6 is a diagram illustrating a relationship between the open/close angle and the moment applied by the hinge mechanism of the present embodiment, and a relationship between the open/close angle and the torque applied by the hinge mechanism of the present embodiment. Note that for describing the configuration of the hinge mechanism 3, a right-and-left direction (X direction) of the printer 100, a front-and-back direction (Y direction) of the printer 100, and an up-and-down direction (Z direction) of the printer 100 are defined, for convenience of description, in a state where the hinge mechanism 3 is fixed to the printer 100.

As illustrated in FIGS. 4 and 5, the hinge mechanism 3 mainly includes a fixed member 31 that serves as a first member, an opening/closing member 32 that serves as a second member, a first pivot member 33 that serves as a third member, and a second pivot member 34 that serves as a fourth member. In addition, the hinge mechanism 3 includes a hinge pivot shaft 35 that serves as a first shaft supported by the fixed member 31, a book pivot shaft 36 that serves as a second shaft supported by the opening/closing member 32, and an equalization shaft 38 that serves as a third shaft supported by the first pivot member 33. In addition, as illustrated in FIG. 5, the hinge mechanism 3 includes a first urging portion F1 that includes a spring 53 that serves as a first spring. The spring 53 applies the torque in a direction in which the ADF 20 is opened, in accordance with the pivot angle of the ADF 20 with respect to the image reading unit 40. The fixed member 31 includes a cam pin 31A that serves as a one-side pressure receiving portion that receives the urging force of the spring 53 applied toward one side of the spring 53. The first pivot member 33 includes a lift shaft 37 that serves as an other-side pressure receiving portion that receives the urging force of the spring 53 applied toward the other side of the spring 53. In addition, the hinge mechanism 3 includes a second urging portion F2 that includes springs 39 that serve as a second spring and a third spring. The second spring and the third spring apply the torque to the second pivot member 34 in a direction in which the abutment portion 21 and the pressing plate 22 becomes parallel to the surface of the platen glass 201.

Specifically, as illustrated in FIG. 5, the fixed member 31 includes a bottom plate 31c that is fixed to the image reading unit 40, a pair of side plates 31d that extends upward from the bottom plate 31c, and a back plate 31e that also extends upward from the bottom plate 31c. That is, the fixed member 31 is formed like a box whose upper portion and front portion are opened, by the bottom plate 31c, the side plates 31d, and the back plate 31e. The pair of side plates 31d includes through-hole portions 31a and 31b that pass through the pair of side plates 31d. The above-described hinge pivot shaft 35 is inserted in the through-hole portion 31a such that the axial direction of the hinge pivot shaft 35 is equal to the right-and-left direction. The hinge pivot shaft 35 is supported by the through-hole portion 31a. In addition, the cam pin 31A is fit in the through-hole portion 31b such that the longitudinal direction of the cam pin 31A is equal to the right-and-left direction. The cam pin 31A is fixed to and supported by the through-hole portion 31b.

As illustrated in FIGS. 4 and 5, the opening/closing member 32 includes a top plate 32c, and a pair of side plates 32d that extends downward from the top plate 32c. That is, the opening/closing member 32 is U-shaped so as to cover the fixed member 31 from above. The pair of side plates 32d includes through-hole portions 32a and 32b that pass through the pair of side plates 32d. The through-hole portion 32a is formed on the back side, and the through-hole portion 32b is formed on the front side. The above-described hinge pivot shaft 35, which is inserted in the through-hole portion 31a of the fixed member 31, is fit in the through-hole portion 32a such that the hinge pivot shaft 35 extends across a portion between the fixed member 31 and the opening/closing member 32 in the right-and-left direction, and is fixed to and supported by the through-hole portion 32a. In addition, the above-described book pivot shaft 36 is inserted in the through-hole portion 32b such that the axial direction of the book pivot shaft 36 is equal to the right-and-left direction, and is supported by the through-hole portion 32b. Thus, the book pivot shaft 36 is disposed at a position different from the position of the hinge pivot shaft 35, and parallel to the hinge pivot shaft 35. The opening/closing member 32 can pivot with respect to the fixed member 31, with a center CT1 of the hinge pivot shaft 35 serving as a fulcrum of the pivot.

As illustrated in FIGS. 4 and 5, the first pivot member 33 includes a top plate 33c that serves as a first top plate, and a pair of side plates 33d that serves as a first pair of side plates and extends downward from the top plate 33c. The pair of side plates 33d are examples of a first pair of side plates. In other words, the first pivot member 33 includes the plate-like side plates 33d that are disposed on planes orthogonal to the book pivot shaft 36, the lift shaft 37, and the equalization shaft 38, and that engage with the book pivot shaft 36, the lift shaft 37, and the equalization shaft 38. In addition, the first pivot member 33 includes the plate-like top plate 33c disposed on a plane orthogonal to the side plates 33d. That is, the first pivot member 33 is U-shaped so as to cover the opening/closing member 32 from above. The pair of side plates 33d includes a through-hole portion 33a, a through-hole portion 33b, and a through-hole portion 33e, which pass through the pair of side plates 33d. The through-hole portion 33b is formed on the front side of the through-hole portion 33a, and the through-hole portion 33e is formed on the lower side of the through-hole portion 33a. The book pivot shaft 36, which is inserted in the through-hole portion 32b of the above-described opening/closing member 32, is fit in the through-hole portion 33a such that the book pivot shaft 36 extends across a portion between the opening/closing member 32 and the first pivot member 33 in the right-and-left direction. The book pivot shaft 36 is fixed to and supported by the through-hole portion 33a. In addition, the above-described equalization shaft 38 is inserted in the through-hole portion 33b such that the axial direction of the equalization shaft 38 is equal to the right-and-left direction. The equalization shaft 38 is supported by the through-hole portion 33b. In addition, the above-described lift shaft 37 is inserted in the through-hole portion 33e such that the axial direction of the lift shaft 37 is equal to the right-and-left direction. The lift shaft 37 is supported by the through-hole portion 33e. Thus, the lift shaft 37 and the equalization shaft 38 are disposed at positions different from the position of the book pivot shaft 36, and parallel to the book pivot shaft 36. The first pivot member 33 can pivot with respect to the opening/closing member 32, with a center CT2 of the book pivot shaft 36 serving as a fulcrum of the pivot.

Each of the side plates 33d (that constitute a pair) of the first pivot member 33 is provided with a spring support portion 33f that serves as an upper-end pressure receiving portion. The spring support portion 33f extends so as to project toward the outside of the pair of the side plate 33d in the axial direction of the equalization shaft 38. In addition, an end portion 33g is formed on the leading end of the spring support portion 33f. The end portion 33g is formed by bending the spring support portion 33f downward. As described in detail below, the spring support portion 33f is engaged with an upper end 39a of the spring 39 of the second urging portion F2, so that the spring support portion 33f receives the urging force of the spring 39. In addition, a below-described abutment regulation portion 34k of the second pivot member 34 can abut on the spring support portion 33f from below. That is, the abutment regulation portion 34k abuts on or is separated from the spring support portion 33f by the pivot of the second pivot member 34.

As illustrated in FIGS. 4 and 5, the second pivot member 34 includes a top plate 34c that serves as a first second top plate, and a pair of side plates 34d that extends downward from the top plate 34c. The pair of side plates 34d are examples of a second pair of side plates. The side plates 34d, which constitute a pair, are disposed so as to face each other. That is, in the right-and-left direction of the printer 100, a side plate 34d(L) that serves as a first side plate is disposed in a left portion of the second pivot member 34, and a side plate 34d(R) that serves as a second side plate is disposed in a right portion of the second pivot member 34. Note that in the following description, the right side plate 34d(R) and the left side plate 34d(L) are referred to simply as the side plate 34d if it is not necessary to distinguish the right side plate 34d(R) and the left side plate 34d(L) from each other.

In other words, the second pivot member 34 includes the pair of side plates 34d that are disposed on planes orthogonal to the equalization shaft 38 and that engage with the equalization shaft 38, and the plate-like top plate 34c that is disposed on a plane orthogonal to the pair of side plates 34d. That is, the second pivot member 34 is U-shaped so as to cover the first pivot member 33 from above. Thus, the second pivot member 34 is disposed such that the top plate 34c is positioned above the top plate 33c of the first pivot member 33.

In addition, the pair of side plates 34d includes a through-hole portion 34a, and a relief hole portion 34b, which pass through the pair of side plates 34d. The through-hole portion 34a is formed on the front side, and the relief hole portion 34b is formed on the back side of the through-hole portion 34a. The book pivot shaft 36, which is inserted in the through-hole portion 32b of the above-described opening/closing member 32 and the through-hole portion 33a of the first pivot member 33, and the lift shaft 37, which is inserted in the through-hole portion 33e of the first pivot member 33, pass through the relief hole portion 34b so as not to interfere with each other. The equalization shaft 38 is fit in the through-hole portion 34a, which is disposed opposite to the hinge pivot shaft 35 with respect to the book pivot shaft 36 in the front-and-back direction, so as to extend across a portion between the first pivot member 33 and the second pivot member 34 in the right-and-left direction. The equalization shaft 38 is fixed to and supported by the through-hole portion 34a. The second pivot member 34 can pivot with respect to the first pivot member 33, with a center CT3 of the equalization shaft 38 serving as a fulcrum of the pivot.

The side plate 34d is integrated with a first support-plate portion 34e in which a screw hole portion 34f is formed, and with a second support-plate portion 34g in which two screw hole portions 34h are formed. Specifically, the first support-plate portion 34e and the second support-plate portion 34g are formed by bending the side plate 34d. Thus, a casing 20C or a frame (not illustrated) of the ADF 20 is fixed to the first support-plate portion 34e and the second support-plate portion 34g by screw-fitting screws (not illustrated) in the screw hole portion 34f and the screw hole portions 34h. In this manner, the second pivot member 34 and the ADF 20 are integrated with each other, and the ADF 20 is opened and closed at an angle of the second pivot member 34.

Each of the second support-plate portions 34g (that constitute a pair) of the second pivot member 34 is provided with a spring support portion 34i that serves as a lower-end pressure receiving portion. The spring support portion 34i extends so as to project from the side plate 34d toward the outside of the pair of the side plate 34d in the axial direction of the equalization shaft 38. The spring support portion 34i is formed by bending the side plate 34d. That is, the spring support portion 34i is formed by bending a portion of the side plate 34d on the hinge pivot shaft 35 side in the width direction, toward the outside of the pair of the side plate 34d. Thus, the spring support portion 34i can be formed by simply performing bending work. As a result, the work for forming the spring support portion 34i can be simplified, compared with the work for forming a spring support portion, for example, in a center portion of the side plate 34d in the front-and-back direction. In addition, an end portion 34j is formed on the leading end of the spring support portion 34i so as to face upward. As described in detail below, the spring support portion 34i is engaged with a lower end 39b of the spring 39 of the second urging portion F2, so that the spring support portion 34i receives the urging force of the spring 39. In addition, since the top plate 34c is not formed in a back portion of the side plate 34d of the second pivot member 34, the above-described abutment regulation portion 34k is formed in the back portion of the side plate 34d. The abutment regulation portion 34k abuts on the above-described spring support portion 33f if the second pivot member 34 in an attachment state is pivoted on the equalization shaft 38 with respect to the first pivot member 33, in a direction in which the ADF 20 is closed with respect to the image reading unit 40, by a predetermined angle An5 (see FIG. 8B). The abutment prevents the second pivot member 34 from pivoting with respect to the first pivot member 33 any more. If the angle of the pivot of the second pivot member 34, on the equalization shaft 38, with respect to the first pivot member 33 is smaller than the predetermined angle An5, the abutment regulation portion 34k is separated from the spring support portion 33f. In this state, the first pivot member 33 and the second pivot member 34 can pivot relative to each other.

The above-described second urging portion F2 includes the pair of springs 39; and the upper end 39a of each spring 39 is supported by the spring support portion 33f of the first pivot member 33, and the lower end 39b of the spring 39 is supported by the spring support portion 34i of the second pivot member 34. Each of the springs 39 (that constitute a pair) is disposed outside the pair of the side plate 34d of the second pivot member 34 in the axial direction of the equalization shaft 38. That is, on the left side of the second pivot member 34 in the right-and-left direction of the printer 100, a spring 39(L) that serves as a second spring is disposed on the left side of the side plate 34d(L). In addition, on the right side of the second pivot member 34, a spring 39(R) that serves as a third spring is disposed on the right side of the side plate 34d(R). In a state where the ADF 20 is closed with respect to the image reading unit 40, the springs 39 are disposed below the top plate 33c of the first pivot member 33, and above the second support-plate portion 34g that is formed at a lower edge of the side plate 34d of the second pivot member 34. Note that in the following description, the right spring 39(R) and the left spring 39(L) are referred to simply as the spring 39 if it is not necessary to distinguish the right spring 39(R) and the left spring 39(L) from each other.

On the other hand, the first urging portion F1 includes a spring 53 that is a coil spring that serves as a first spring, a first slider 51 that serves as a first support member, and a second slider 52 that serves as a second support member. The first slider 51 and the second slider 52 are disposed at both ends of the spring 53. The first slider 51 is in contact with one end 53a of the spring 53 and supports the one end 53a of the spring 53, and can slide with respect to the top plate 32c and the side plate 32d (see FIG. 4) of the opening/closing member 32. In addition, an end surface 51a of the first slider 51 opposite to the spring 53 is in contact with the above-described cam pin 31A, and engages with the cam pin 31A. That is, the urging force of the spring 53 applied toward one side of the spring 53 is received by the fixed member 31 via the cam pin 31A.

Similarly, the second slider 52 is in contact with the other end 53b of the spring 53 and supports the other end 53b of the spring 53, and can slide with respect to the top plate 32c and the side plate 32d (see FIG. 4) of the opening/closing member 32. In addition, an end surface 52a of the second slider 52 opposite to the spring 53 is in contact with the above-described lift shaft 37, and engages with the lift shaft 37. That is, the urging force of the spring 53 applied toward the other side of the spring 53 is received by the lift shaft 37.

Next, the torque applied by the first urging portion F1 configured in this manner will be described. When the ADF 20 is opened and closed, and thereby the opening/closing member 32 is mainly opened and closed with respect to the fixed member 31, the first slider 51, together with the opening/closing member 32, pivots, with the center CT1 of the hinge pivot shaft 35 serving as a fulcrum, while the cam pin 31A is fixed to the fixed member 31. With this operation, the spring 53 expands and contracts in accordance with the shape of the end surface 51a that is in contact with and engaged with the cam pin 31A. As a result, the urging force of the spring 53 applied to the lift shaft 37, which can pivot on the center CT2 of the book pivot shaft 36, changes because the book pivot shaft 36 is positioned with respect to the opening/closing member 32.

An open/close angle An1 (see FIG. 5) is a pivot angle of the opening/closing member 32 that pivots with respect to the fixed member 31, with the hinge pivot shaft 35 serving as a fulcrum. FIG. 6 illustrates a relationship between the open/close angle An1 and a moment M applied in a direction in which the ADF 20 is closed with respect to the image reading unit 40, and a relationship between the open/close angle An1 and a torque T applied by the first urging portion F1 in a direction in which the ADF 20 is opened. If the open/close angle An1 is an angle An1a (that is in a range from 10 to 20 degrees, for example), the torque T applied by the first urging portion F1 has a peak value.

Thus, if the open/close angle An1 is equal to or smaller than 10 degrees, or the ADF 20 is closed until the open/close angle An1 becomes equal to or smaller than 10 degrees, the moment M produced by the self-weight of the ADF 20 becomes larger than the torque T produced by the first urging portion F1 of the hinge mechanism 3, and the ADF 20 is closed by the self-weight of the ADF 20. In addition, if the open/close angle An1 is equal to or larger than 20 degrees, the torque T produced by the first urging portion F1 of the hinge mechanism 3 is equal to or larger than the moment M produced by the self-weight of the ADF 20. Thus, in this case, a state where the ADF 20 is opened can be kept, and the ADF 20 can be easily opened and closed.

Bending Produced in Accordance with Stiffness of ADF

Figure 3A:
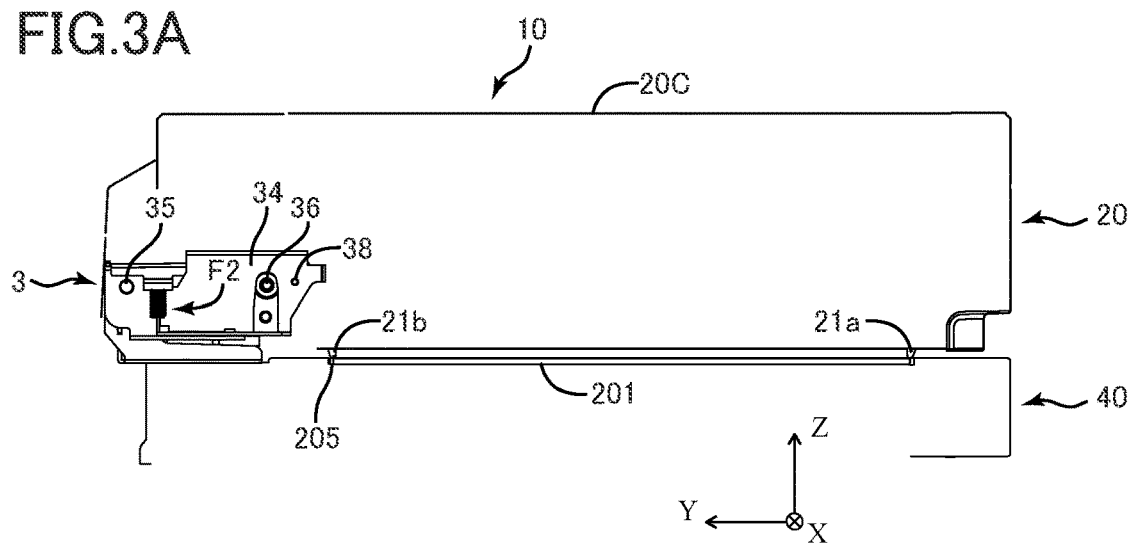
FIG. 3A is a schematic cross-sectional view illustrating a state where the ADF is closed without being bent.
Figure 3B:
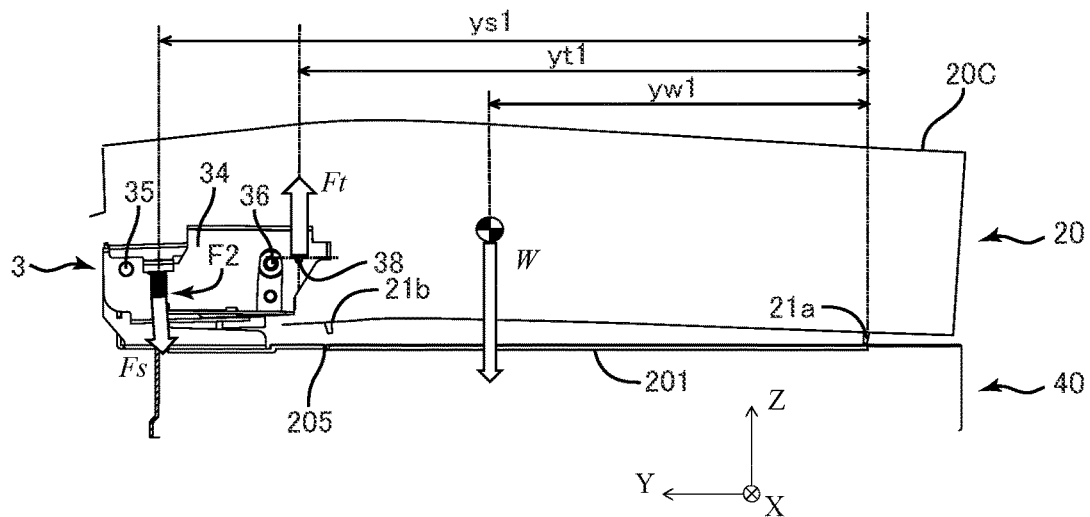
FIG. 3B is a schematic cross-sectional view illustrating a state where the ADF is bent and a front abutment portion abuts on an image reading unit.
Figure 3C:
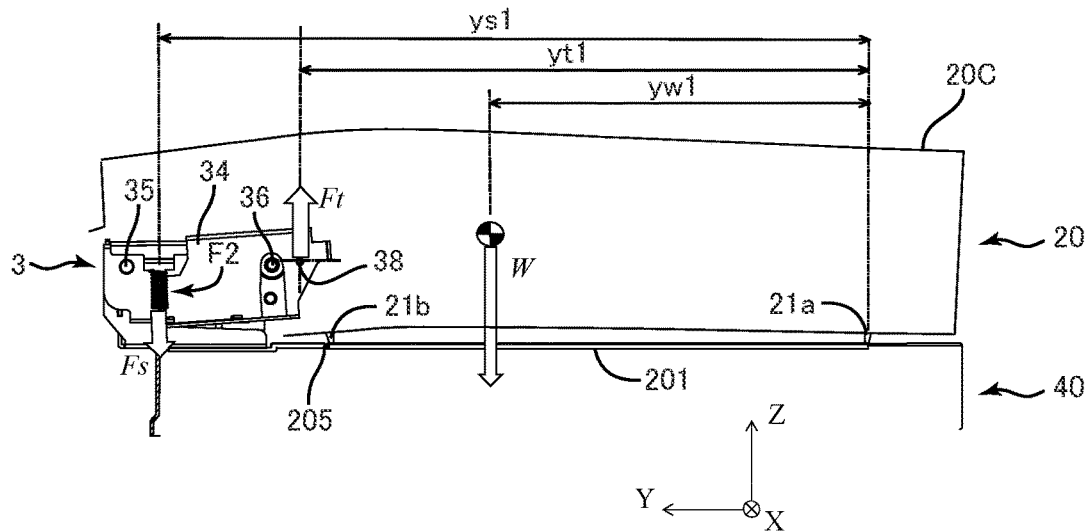
FIG. 3C is a schematic cross-sectional view illustrating a state where the ADF is bent and the front abutment portion and a back abutment portion abut on the image reading unit.

Next, the bending of the ADF 20 produced in accordance with the stiffness of the ADF 20 when the ADF 20 is opened and closed, and an abutment state between the abutment portion 21 and the platen glass 201 (including the frame portion 205) will be described with reference to FIGS. 3A to 3C. FIG. 3A is a schematic cross-sectional view illustrating a state where the ADF is closed without being bent. FIG. 3B is a schematic cross-sectional view illustrating a state where the ADF is bent and the front abutment portion abuts on the image reading unit. FIG. 3C is a schematic cross-sectional view illustrating a state where the ADF is bent and the front abutment portion and the back abutment portion abut on the image reading unit. As described above, the abutment portion 21 may abut on the frame portion 205. However, the abutment of the abutment portion 21 against the frame portion 205 produces the same effect as that produced by the abutment of the abutment portion 21 against the platen glass 201. Thus, the following description will be made for a case where the abutment portion 21 abuts on the platen glass 201.

As illustrated in FIG. 3A, in a case where a frame (not illustrated) of the ADF 20 has high stiffness and the casing 20C of the ADF 20 is not bent, when the ADF 20 is closed, the abutment portions 21a and 21b abut on the platen glass 201 such that the abutment portions 21a and 21b are parallel with the platen glass 201. However, in a case where the ADF 20 includes a resin flame, for example, for reducing the weight and cost, the casing 20C is bent, as illustrated in FIG. 3B, by the self-weight of the casing 20C because the ADF 20 has low stiffness. Thus, if the ADF 20 is closed with respect to the image reading unit 40, a front portion of the ADF 20 bends down, and the front abutment portion 21a abuts on the platen glass 201, earlier than the back abutment portion 21b does.

In addition, as described above, the hinge mechanism 3 is applied with the torque T (see FIG. 6) by the first urging portion F1, in a direction in which the ADF 20 is opened, for easily opening and closing the ADF 20. Thus, a force Ft caused by the torque T is applied to the lift shaft 37. Thus, if a component such as the second urging portion F2 is not disposed, the abutment portion 21b abuts on the platen glass 201 and is lifted even though the ADF 20 is closed.

However, as illustrated in FIG. 3C, since the hinge mechanism 3 of the present embodiment is provided with the above-described second urging portion F2, the urging force (force Fs) of the spring 39 presses the spring support portion 34i (see FIG. 4) of the second pivot member 34, with respect to the first pivot member 33. With this operation, the back abutment portion 21b can abut on the platen glass 201. That is, the parallelism between the front abutment portion 21a and the back abutment portion 21b is adjusted, so that a conveyance channel is formed with high accuracy between the platen glass 201 and the ADF 20. In the present embodiment, the adjustment of the parallelism is referred to as equalization. Hereinafter, the equalization of the hinge mechanism 3 will be described in detail with reference to FIGS. 7A to 7C.

Equalization of Hinge Mechanism

Figure 7A:
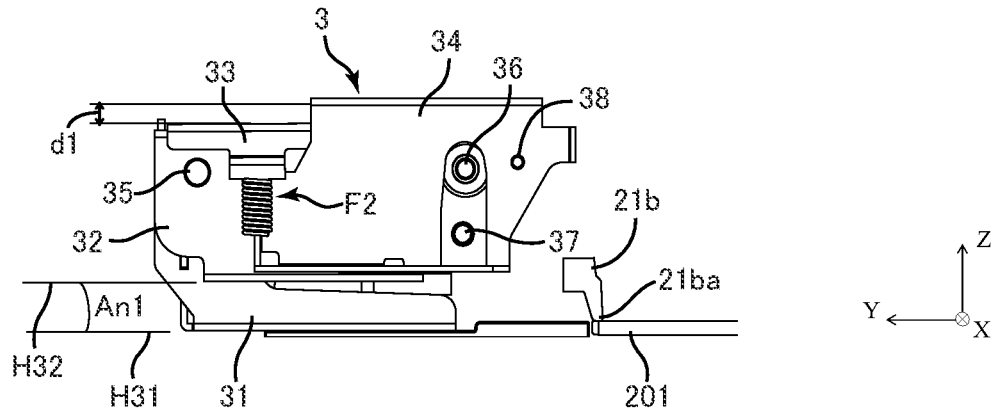
FIG. 7A is a side view illustrating the hinge mechanism that is in a state where the ADF is closed without being bent.
Figure 7B:
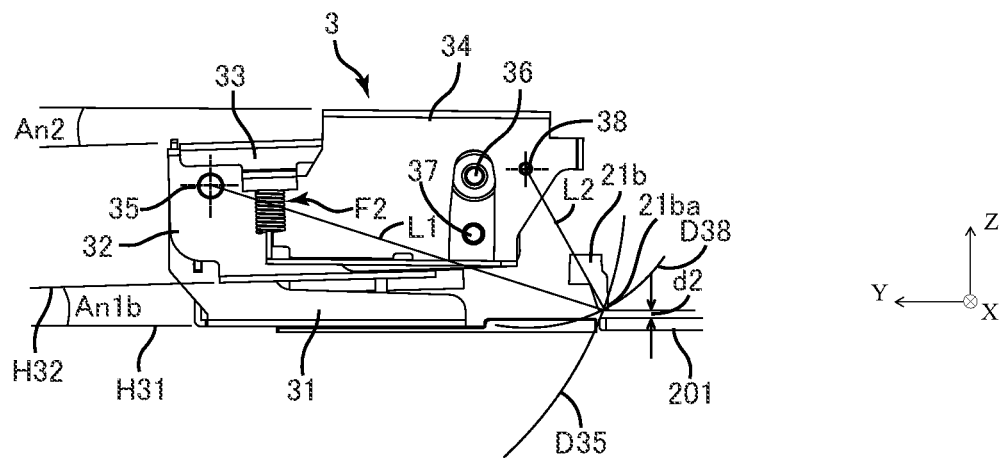
FIG. 7B is a side view illustrating the hinge mechanism that is in a state where the ADF is bent and the front abutment portion abuts an image reading unit.
Figure 7C:
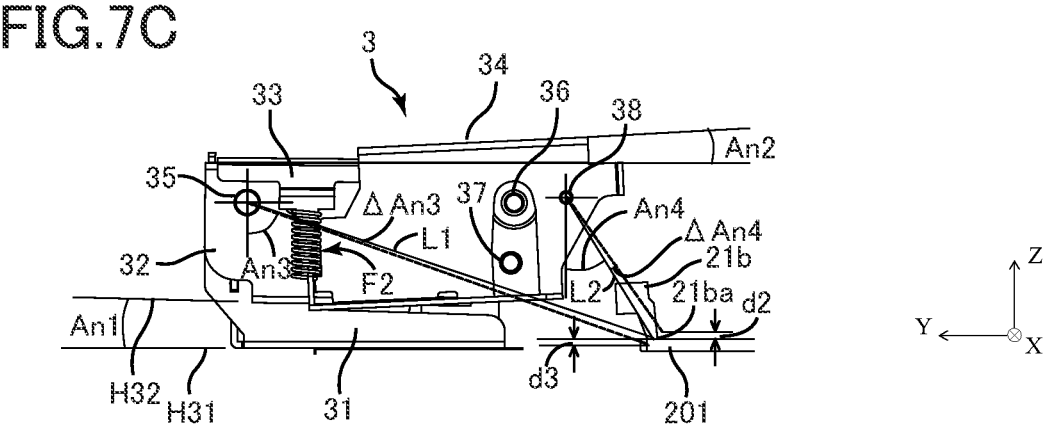
FIG. 7C is a side view illustrating the hinge mechanism that is in a state where the ADF is bent and the front abutment portion and the back abutment portion abut on the image reading unit.

The equalization of the abutment portions 21a and 21b performed by the hinge mechanism 3, with respect to the platen glass 201, will be described with reference to FIGS. 3A, 3B, and 3C and FIGS. 7A, 7B, and 7C. FIG. 7A is a side view illustrating the hinge mechanism 3 that is in a state where the ADF 20 is closed without being bent. FIG. 7B is a side view illustrating the hinge mechanism 3 that is in a state where the ADF 20 is bent and the front abutment portion 21a abuts on the image reading unit 40. FIG. 7C is a side view illustrating the hinge mechanism 3 that is in a state where the ADF 20 is bent and the front abutment portion 21a and the back abutment portion 21b abut on the image reading unit 40.

Note that in the following description, the angle of each component, an imaginary line, positions of each shaft and abutment portion, which will be described with reference to FIGS. 7A, 7B, and 7C, are viewed from the axial direction (X direction) of the hinge pivot shaft 35, the book pivot shaft 36, the lift shaft 37, and the equalization shaft 38.

As illustrated in FIG. 7A, when the ADF 20 in an open state is closed, the open/close angle An1 between a reference plane H31 on which the fixed member 31 is disposed and the bottom surface H32 of the opening/closing member 32 decreases. Note that the bottom surface H32 is parallel with the top plate 32c (see FIG. 4) and a center line of the spring 53 (see FIG. 5).

FIG. 7A illustrates the hinge mechanism 3 that is in a state where the casing 20C of the ADF 20 is not bent as illustrated in FIG. 3A and the ADF 20 is ideally closed with respect to the image reading unit 40. As illustrated in FIG. 7A, in a state where the ADF 20 is ideally closed, the bottom surface H32 of the opening/closing member 32 is positioned parallel with the reference plane H31. Thus, the second pivot member 34, to which the ADF 20 is fixed, is also positioned parallel with the reference plane H31, and the back abutment portion 21b abuts on the platen glass 201. In this state, a clearance d1 is formed between a back-side portion of the second pivot member 34 and a back-side portion of the first pivot member 33.

Note that an end portion 21ba of the abutment portion 21b that contacts the platen glass 201 is an end portion of one of the abutment portions 21a and 21b on the hinge mechanism 3 side (the abutment portions 21a and 21b serve as an abutment portion that abuts on the image reading unit 40).

The structure of the above-described hinge mechanism 3 allows components, including the abutment portion 21b, other than the fixed member 31 of the hinge mechanism 3 and the ADF 20 to pivot, with the hinge pivot shaft 35 serving as a fulcrum. Thus, the end portion 22ba of the abutment portion 21b roughly pivots along a pivot trajectory D35 that has a radius that extends from a center that is the hinge pivot shaft 35. In addition, the second pivot member 34 pivots, with the equalization shaft 38 serving as a fulcrum. Thus, the back abutment portion 21b, which is disposed on the ADF 20 fixed to the second pivot member 34, pivots also along a pivot trajectory D38 that has a radius that extends from a center that is the equalization shaft 38.

As described above, since the frame of the ADF 20 actually has low stiffness, a front portion of the ADF 20 (on the −Y direction side) bends down, as illustrated in FIG. 3B. As a result, the front abutment portion 21a abuts on the platen glass 201 earlier than the back abutment portion 21b does, and at this moment, the back abutment portion 21b is lifted from the platen glass 201.

At this moment, the hinge mechanism 3 is in a state illustrated in FIG. 7B. In this state, the opening/closing member 32 is slightly opened at an open/close angle An1b with respect to the ideal state illustrated in FIG. 7A, and the abutment portion 21b is lifted and separated from the platen glass 201 by a distance d2.

In addition, in this state, as illustrated in FIG. 3B, a self-weight W of the ADF 20 is applied at a position of the center of gravity separated from the front abutment portion 21a by a distance yw1, so that the moment is applied in a direction in which the ADF 20 is closed. In addition to this, a force Ft is applied to the equalization shaft 38. The force Ft is caused by the torque produced by the above-described first urging portion F1 of the hinge mechanism 3 in a direction in which the ADF 20 is opened. Note that the equalization shaft 38 is positioned at a position separated from the front abutment portion 21a by a distance yt1. Furthermore, as described above, the spring 39 of the second urging portion F2 applies the force Fs, which presses the second pivot member 34 toward the first pivot member 33, at a position separated from the front abutment portion 21a by a distance ys1.

The condition under which the total of the force Fs produced by the spring 39 and the moment caused by the self-weight W of the ADF 20 is larger than the moment caused by the torque of the first urging portion F1 of the hinge mechanism 3 is expressed by the following expression (1).

$$Fs \cdot ys1 + W \cdot yw1 > Ft \cdot yt1 \quad (1)$$

If the expression (1) is satisfied, the equalization shaft 38 applied with the torque T of the first urging portion F1 is pushed down. That is, the opening/closing member 32 is closed, and the back abutment portion 21b of the ADF 20 is moved down such that the back abutment portion 21b abuts on the platen glass 201, i.e., the image reading unit 40.

That is, in the hinge mechanism 3 illustrated in FIG. 7B, the equalization shaft 38, together with the opening/closing member 32, the first pivot member 33, and the second pivot member 34, pivots on the hinge pivot shaft 35, clockwise in FIG. 7B. In addition, since the second pivot member 34 is pressed by the spring 39, the second pivot member 34 pivots on the equalization shaft 38, counterclockwise in FIG. 7B, toward the first pivot member 33, and enters a state illustrated in FIG. 7C. As a result, in a state illustrated in FIG. 7C, the clearance d1 (see FIG. 7A) between the back-side portion of the second pivot member 34 and back-side portion of the first pivot member 33 decreases. That is, in the state illustrated in FIG. 7C, the angle An2 between the top plate 33c of the first pivot member 33 and the top plate 34c of the second pivot member 34 is changed from an angle that is acute on the back side, to an angle that is acute on the front side.

In other words, the second pivot member 34 pivots on the equalization shaft 38 with respect to the first pivot member 33, so that the abutment portion 21b moves with respect to the platen glass 201, toward a direction in which the abutment portion 21b is separated from the platen glass 201.

As a result, an imaginary line L2 that connects the center of the equalization shaft 38 and the end portion 21ba of the abutment portion 21b, and that has an angle An4 between the imaginary line L2 and a line perpendicular to the reference plane H31 pivots by an angle An4.

On the other hand, a portion of the opening/closing member 32 and a portion of the first pivot member 33 on the front side, on which the abutment portion 21b is disposed, pivot downward on the hinge pivot shaft 35 with respect to the fixed member 31. That is, an imaginary line L1 that connects the center of the hinge pivot shaft 35 and the end portion 21ba of the abutment portion 21b, and that has an angle An3 between the imaginary line L1 and a line perpendicular to the reference plane H31 pivots by an angle An3. As a result, the leading end of the imaginary line L1 overlaps with a portion below the reference plane H31, by a distance d3.

As described above, in the equalization illustrated in FIG. 7C, the pivot of the opening/closing member 32 and the first pivot member 33 on the hinge pivot shaft 35 with respect to the fixed member 31, and the pivot of the second pivot member 34 on the equalization shaft 38 with respect to the first pivot member 33 are combined with each other. With this combination, the end portion 21ba of the abutment portion 21b abuts on the platen glass 201, so as not to be lifted.

Note that the angle An3, by which the imaginary line L1 pivots such that the leading end of the imaginary line L1 overlaps with the lower portion below the reference plane H31, is determined depending on the position of the equalization shaft 38 of the hinge mechanism 3. That is, the angle An3 decreases as the angle An4, which is formed between the imaginary line L2 that connects the end portion 21ba of the abutment portion 21b and the center of the equalization shaft 38 and a line perpendicular to the reference plane H31, decreases.

In the hinge mechanism 3 of the present embodiment, the equalization shaft 38 is disposed opposite to the hinge pivot shaft 35 with respect to the book pivot shaft 36. In particular, the equalization shaft 38 is disposed on the front side of the book pivot shaft 36 (in the Y direction) and closer to the abutment portion 21b. With this arrangement, in the equalization, the angle An4, by which the above-described angle An4 changes, becomes extremely slight, compared with the angle An3, by which the above-described angle An3 changes. Thus, the decrease in the torque T (produced by the first urging portion F1), caused by the pivot of the opening/closing member 32 in the equalization, is negligible and causes almost no influence.

Book Equalization

Figure 8A:
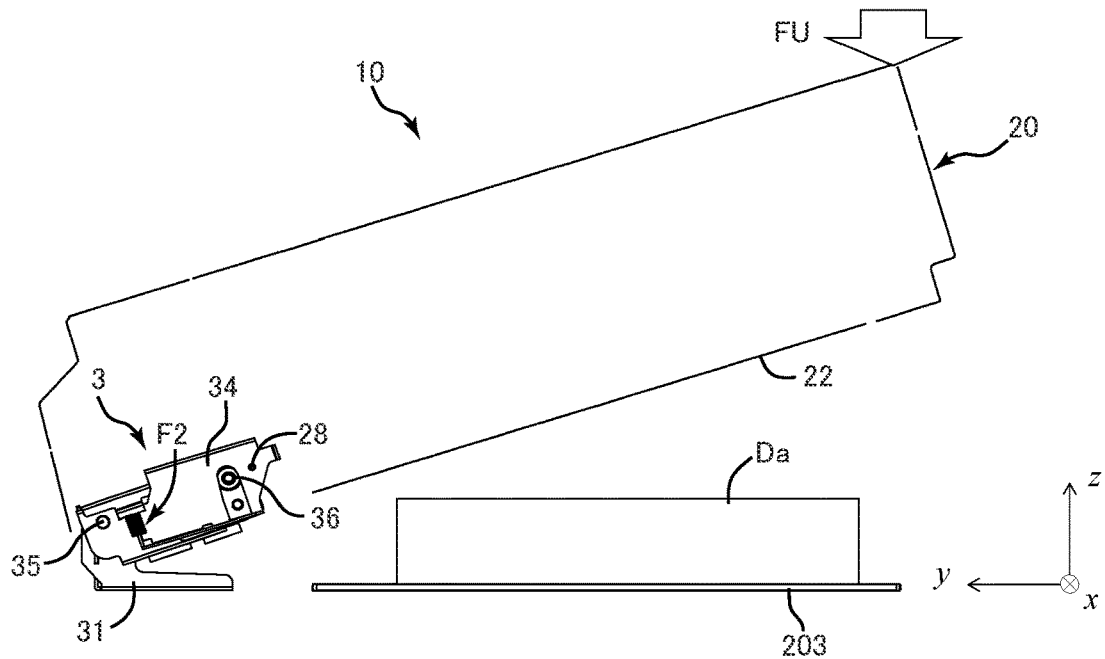
FIG. 8A is a schematic cross-sectional view illustrating a document reading apparatus that is in a state where a thick document is set on a document platen glass and the ADF is opened at an angle at which the hinge torque is increased.
Figure 8B:
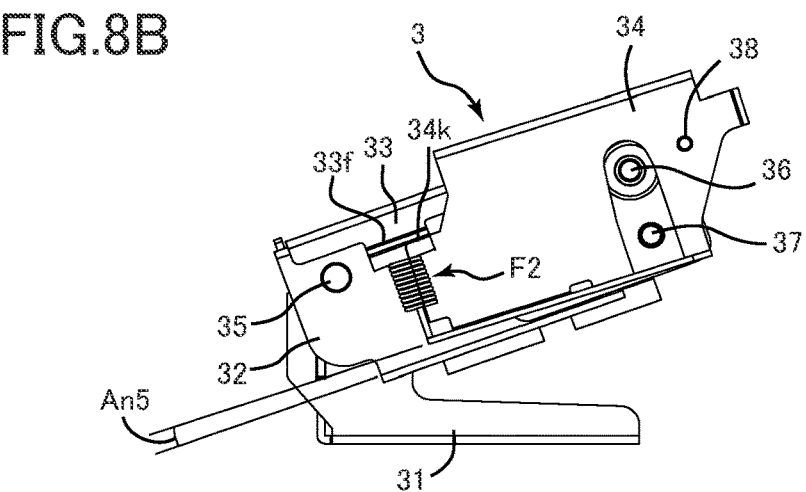
FIG. 8B is a side view illustrating the hinge mechanism that is in the state illustrated in FIG. 8A.
Figure 8C:
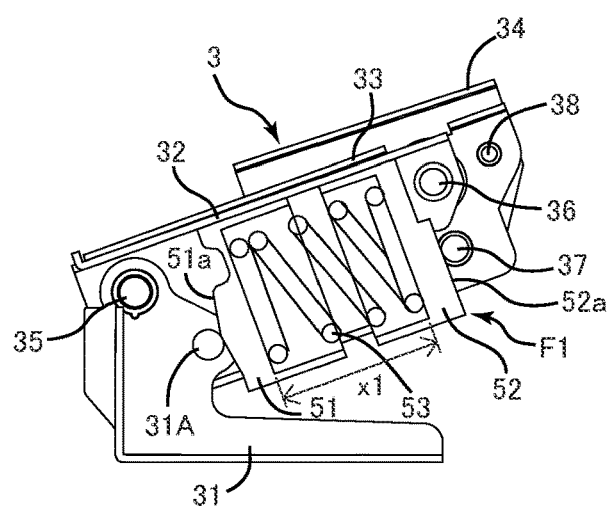
FIG. 8C is a cross-sectional view illustrating the hinge mechanism that is in the state illustrated in FIG. 8A.
Figure 9A:
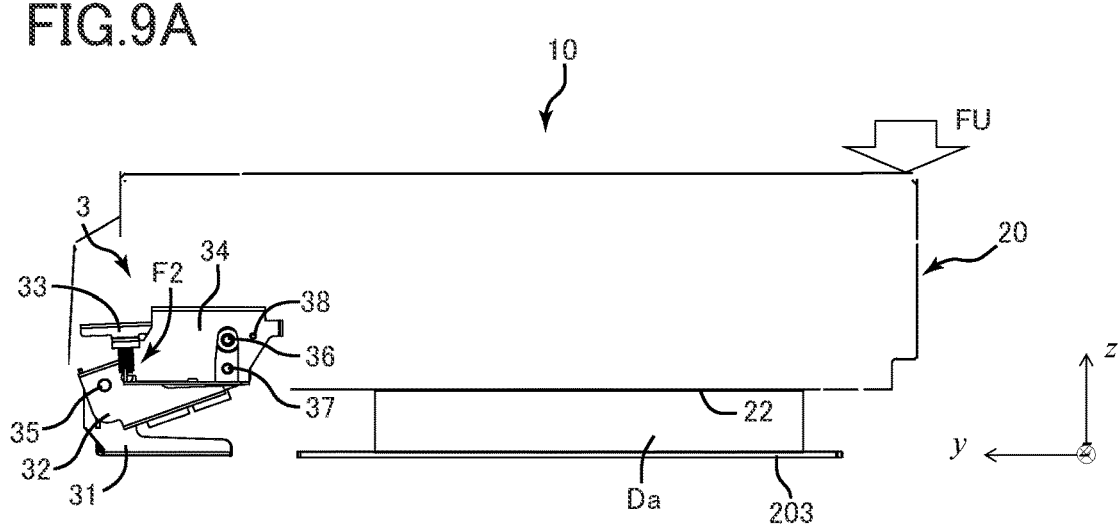
FIG. 9A is a schematic cross-sectional view illustrating the document reading apparatus that is in a state where a thick document is set on the document platen glass and the ADF is closed.
Figure 9B:
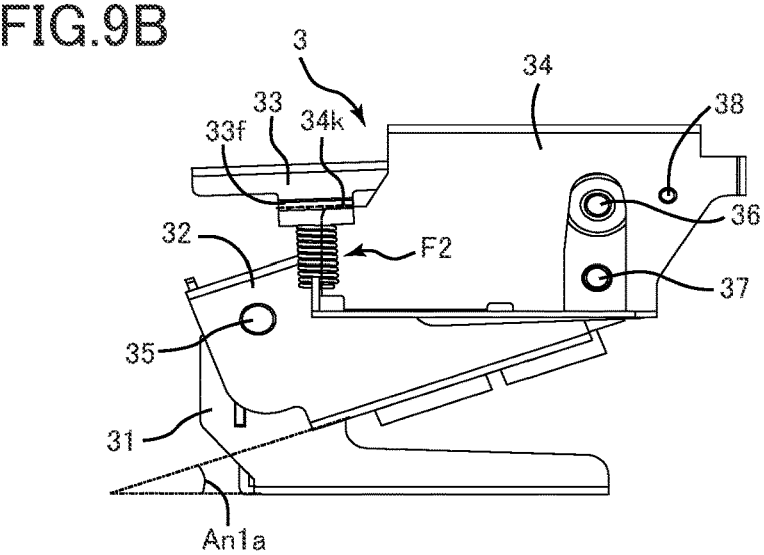
FIG. 9B is a side view illustrating the hinge mechanism that is in the state illustrated in FIG. 9A.
Figure 9C:
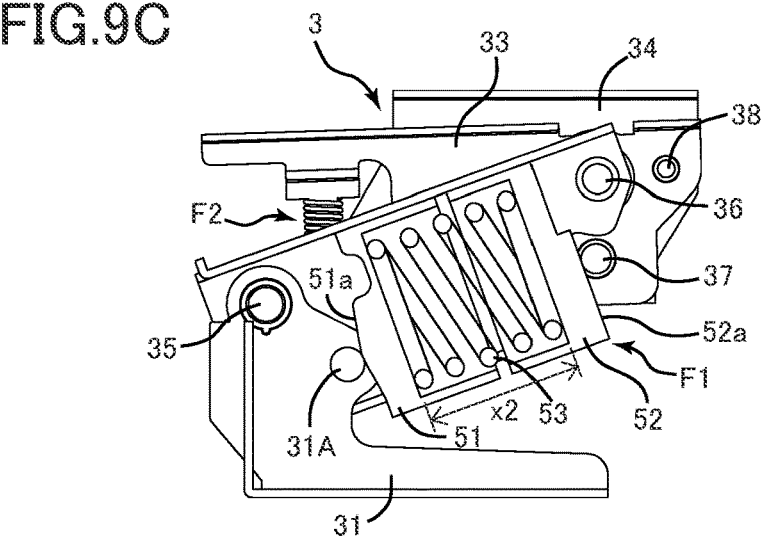
FIG. 9C is a cross-sectional view illustrating the hinge mechanism that is in the state illustrated in FIG. 9A.

Next, book equalization will be described with reference to FIGS. 8A, 8B, 8C, 9A, 9B, and 9C. The book equalization is performed when a thick document Da, such as a dictionary, is placed on the document platen glass 203 for executing the fixed-document reading mode and the ADF 20 is closed. FIG. 8A is a schematic cross-sectional view illustrating the document reading apparatus 10 that is in a state where the thick document Da is set on the document platen glass 203 and the ADF 20 is opened at an angle at which the hinge torque is increased. FIG. 8B is a side view illustrating the hinge mechanism 3 that is in the state illustrated in FIG. 8A. FIG. 8C is a cross-sectional view illustrating the hinge mechanism 3 that is in the state illustrated in FIG. 8A. FIG. 9A is a schematic cross-sectional view illustrating the document reading apparatus 10 that is in a state where the thick document Da is set on the document platen glass 203 and the ADF 20 is closed. FIG. 9B is a side view illustrating the hinge mechanism 3 that is in the state illustrated in FIG. 9A. FIG. 9C is a cross-sectional view illustrating the hinge mechanism 3 that is in the state illustrated in FIG. 9A.

The book equalization is an operation in which the ADF 20 is adjusted, as illustrated in FIG. 9A, so as to be parallel with the document platen glass 203. In the book equalization, if an operation force FU is applied downward, as illustrated in FIG. 8A, to a front portion of the ADF 20 by a user, the ADF 20 pivots clockwise on the book pivot shaft 36. Hereinafter, an operation in the book equalization will be described.

In the fixed-document reading mode, a document placed on the document platen glass 203 can be read by moving the reading portion 30 (see FIG. 1) in the X direction (i.e., the right-and-left direction) while causing the reading portion 30 to scan the document in the Y direction. In particular, if the document is thin, the document can be pressed against the document platen glass 203 by using the pressing plate 22 of the ADF 20, by closing the ADF 20 with respect to the image reading unit 40.

However, as illustrated in FIG. 8A, there is a case in which the document Da placed on the document platen glass 203 is a thick book, such as a dictionary. In such a case, the document Da is placed on the document platen glass 203 such that facing pages face the document platen glass 203. As a result, a center portion of the facing pages will be lifted, so that an image of the center portion may be out of focus or darkened. Thus, it is preferable that the whole of the document Da (in particular, the center portion of the facing pages) be pressed such that the ADF 20 is made parallel with the document platen glass 203.

FIG. 8B illustrates the hinge mechanism 3 that is in the state illustrated in FIG. 8A. In this state, the open/close angle of the hinge mechanism 3 is equal or close to the angle An1a illustrated in FIG. 6, and the torque T produced by the first urging portion F1 in a direction in which the ADF 20 is opened has the maximum value. The moment M produced by the self-weight of the ADF 20 is slightly decreased from the moment obtained when the ADF 20 is closed.

The force Fs produced by the spring 39 of the second urging portion F2 and the self-weight W of the ADF 20 are balanced, like a seesaw, on the lift shaft 37 (see FIG. 3C). Thus, if the force Fs produced by the spring 39 is stronger than the self-weight W of the ADF 20, the second pivot member 34 pivots on the equalization shaft 38 with respect to the first pivot member 33.

FIG. 8C is a cross-sectional view illustrating the hinge mechanism 3 that is in the state illustrated in FIGS. 8A and 8B. The first pivot member 33 can pivot, with the book pivot shaft 36 serving as a fulcrum. In this state, the first pivot member 33 is pressed by the second slider 52, which is pressed by the spring 53, via the lift shaft 37. Thus, the first pivot member 33 is applied with the moment produced counterclockwise in FIG. 8C, and a back end portion of the top plate 33c is in contact with the top plate 32c of the opening/closing member 32. In the interior of the opening/closing member 32, the first slider 51 of the first urging portion F1 is in contact with and engaged with the cam pin 31A, and the lift shaft 37 is in contact with the second slider 52. In this state, the spring 53 has an active length of x1.

In this state, if the operation force FU is additionally applied to the ADF 20, the second pivot member 34 pivots, as described above, by a predetermined angle, with the equalization shaft 38 serving as a fulcrum, and the above-described abutment regulation portion 34k abuts on the spring support portion 33f. The abutment causes the first pivot member 33 and the second pivot member 34 to be integrated with each other. In addition, the operation force FU causes the lift shaft 37 to pivot, with the book pivot shaft 36 serving as a fulcrum; and the pivot of the lift shaft 37 produces the moment that presses the second slider 52 and reduces the length of the spring 53.

As a result, the book equalization is completed, as illustrated in FIG. 9A. In this state, the pressing plate 22 of the ADF 20 is parallel with the document platen glass 203, and the whole of the document Da can be pressed against the document platen glass 203 downward in the vertical direction, by using the pressing plate 22. However, this state cannot be kept unless the operation force FU is continuously applied to the ADF 20, because the resilience by the spring 53 of the first urging portion F1 is applied strongly to the lift shaft 37.

FIG. 9B illustrates the hinge mechanism 3 that is in the state illustrated in FIG. 9A. In this state, the opening/closing member 32 is opened at an angle An1a, with the hinge pivot shaft 35 serving as a fulcrum; and the first pivot member 33 and the second pivot member 34 have pivoted clockwise in FIG. 9B, with the book pivot shaft 36 serving as a fulcrum. In this manner, the angle of the pressing plate 22 of the ADF 20 is set so that the pressing plate 22 of the ADF 20 is parallel to the document platen glass 203, and the pressing plate 22 uniformly presses the whole of the document Da.

In this state, the abutment regulation portion 34k of the second pivot member 34 keeps the state where the abutment regulation portion 34k is in contact with the spring support portion 33f; and transmits the operation force FU, which is applied to a front portion of the ADF 20, from the second pivot member 34 to the first pivot member 33. The contact between the abutment regulation portion 34k and the spring support portion 33f and the transmission of the operation force FU from the second pivot member 34 to the first pivot member 33 produce the moment that causes the lift shaft 37 to push and contract the spring 53 of the first urging portion F1, and that pivots the first pivot member 33 and the second pivot member 34, integrally, clockwise in FIG. 9B, with the book pivot shaft 36 serving as a fulcrum.

Note that since the abutment regulation portion 34k is in contact with the spring support portion 33f, the second pivot member 34 in the state of FIG. 9A does not pivot any more, clockwise in FIG. 9A, with the equalization shaft 38 serving as a fulcrum. Thus, the second pivot member 34 does not contract the spring 39 of the second urging portion F2 any more. Since the spring 39 is not contracted any more as described above, each loop of the spring 39 is not brought into close contact with an adjacent loop. As a result, the weakening of the spring 39 can be avoided.

FIG. 9C is a cross-sectional view illustrating the hinge mechanism 3 that is in the state illustrated in FIGS. 9A and 9B. Since the lift shaft 37 pushes the second slider 52 against the spring 53, the spring 53 has an active length of x2 that is smaller than the above-described length x1. In the state illustrated in FIG. 9C, the angle of the opening/closing member 32 remains the angle An1a, and the torque T produced by the hinge mechanism 3 is equal or near to the maximum value, as illustrated in FIG. 6. That is, the spring 53 is contracted to the nearly maximum extent in a state where the first slider 51 is engaged with the cam pin 31A, and stronger urging force is applied to the lift shaft 37 because the spring 53 is further contracted. Thus, if the first pivot member 33 is pivoted with respect to the opening/closing member 32 in a direction in which the ADF 20 is closed, the spring 53 is contracted via the lift shaft 37, and the spring 53 applies the torque to the first pivot member 33 in a direction (in which the ADF 20 is opened) opposite to the direction in which the ADF 20 is closed.

Arrangement of Second Urging Portion

Next, arrangement of the above-described second urging portion F2 of the hinge mechanism 3 of the present embodiment will be described. The second urging portion F2 of the hinge mechanism 3 applies the urging force that pivots the second pivot member 34 on the equalization shaft 38 with respect to the first pivot member 33 in a direction in which the ADF 20 is opened (that is, in a direction in which the abutment portion 21b becomes lower in height than the abutment portion 21a). For achieving the function of the second urging portion F2, the top plate 34c of the second pivot member 34 could be pressed downward with respect to the top plate 33c of the first pivot member 33. In this case, since the interior of the hinge mechanism 3 contains the first urging portion F1, another spring would be disposed above the top plate 34c for disposing the spring between the top plate 33c and the top plate 34c. In this case, however, the size of the hinge mechanism 3 will be increased in the up-and-down direction, and the ADF 20 will be upsized as a whole.

In addition, if the spring is interposed between the top plate 33c and the top plate 34c, the urging force of the spring may bend the top plate 33c and the top plate 34c. As a result, the urging force of the spring may escape, and the amount of pivot of the second pivot member 34 may be decreased in the equalization. That is, the amount of adjustment for abutting the abutment portion 21b against the document platen glass 203 may be decreased in the equalization. If the thickness of the top plates 33c and 34c is increased for avoiding the above-described problem, the size and cost of the hinge mechanism 3 will be increased.

As countermeasures, each of the springs 39 (that constitute a pair) of the second urging portion F2 of the hinge mechanism 3 of the present embodiment is disposed outside the pair of the side plate 34d of the second pivot member 34 in the axial direction of the equalization shaft 38. With this arrangement, the upsizing of the hinge mechanism 3 in the up-and-down direction can be prevented. In addition, in this configuration, since the spring 39 does not press the top plate 33c and the top plate 34c, it is not necessary to increase the thickness of the top plates 33c and 34c. This feature can also prevent the size and cost of the hinge mechanism 3 from increasing.

In particular, in the hinge mechanism 3 of the present embodiment, in a state where the ADF 20 is closed with respect to the image reading unit 40, the spring 39 is disposed below the top plate 33c of the first pivot member 33, and above the lower edge of the side plate 34d of the second pivot member 34. In this arrangement, the spring 39 does not project upward from the hinge mechanism 3, and does not interfere with the image reading unit 40. As a result, the spring 39 can be disposed such that the hinge mechanism 3 is made compact in the up-and-down direction.

Furthermore, in the hinge mechanism 3 of the present embodiment, the first pivot member 33 includes the spring support portion 33f, which extends outward from the pair of the side plate 33d, engages with the upper end 39a of the spring 39, and receives the urging force of the spring 39. In addition, the second pivot member 34 includes the spring support portion 34i, which extends outward from the pair of the side plate 34d, engages with the lower end 39b of the spring 39, and receives the urging force of the spring 39. Thus, the spring support portions 33f and 34i allow the spring 39 to be disposed outside the pair of the side plate 34d of the second pivot member 34, and allow the urging force of the spring 39 to be applied between the first pivot member 33 and the second pivot member 34. Note that since the spring support portions 33f and 34i can be easily formed by bending the side plates 33d and 34d in press work, the cost can be reduced.

Feasibility of Other Embodiments

In the present embodiment described above, in a state where the ADF 20 is closed with respect to the image reading unit 40, the spring 39 is disposed below the top plate 33c of the first pivot member 33, and above the lower edge of the side plate 34d of the second pivot member 34. That is, when viewed from the axial direction, the spring 39 overlaps with a space between the first pivot member 33 and the second pivot member 34 in the up-and-down direction. However, the present disclosure is not limited to this. For example, a portion of the spring 39 may project from the space between the first pivot member 33 and the second pivot member 34 in the up-and-down direction. That is, as long as a portion of the spring 39 overlaps with the space between the first pivot member 33 and the second pivot member 34 in the up-and-down direction when viewed from the axial direction, the hinge mechanism 3 can be made compact in the up-and-down direction.

In addition, in the present embodiment, the end surface 51a that engages with the cam pin 31A is formed on the first slider 51 of the first urging portion F1, so that the torque T, which is applied in a direction in which the ADF 20 is opened, is changed in accordance with the open/close angle of the ADF 20. However, the present disclosure is not limited to this. For example, the urging force of one end of the spring 53 may be simply received, and a constant torque may be applied in a direction in which the ADF 20 is opened. In this case, the first slider 51 and the second slider 52 may not be disposed, and the spring 53 may be disposed so as to be directly in contact with the fixed member 31 and the lift shaft 37. In addition, for changing the torque T in accordance with the open/close angle, a cam that rotates in accordance with the open/close angle may be interposed. That is, the cam mechanism may be any mechanism as long as the mechanism changes the urging force of the first urging portion in accordance with the open/close angle.

In addition, in the present embodiment, the abutment regulation portion 34k is formed in the second pivot member 34. The abutment regulation portion 34k abuts on the spring support portion 33f, and transmits the operation force, applied by a user in a direction in which the ADF 20 is closed, to the first pivot member 33. However, the present disclosure is not limited to this. That is, any structure is applicable as long as the structure includes a portion of the first pivot member 33 and a portion of the second pivot member 34 that abut on each other when the second pivot member 34 pivots with respect to the first pivot member 33 by a predetermined angle.

The present invention can make the hinge mechanism 3 compact in the up-and-down direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110606, filed Jul. 8, 2022, which is hereby incorporated by reference herein in its entirety.

What is claimed is:

1. A document reading apparatus comprising:
an image reading unit including
a transparent member configured to transmit light, and
a reading portion configured to read an image on a document via the transparent member;
a document conveyance unit configured to convey a document such that the document passes across a surface of the transparent member; and
a hinge mechanism configured to support the document conveyance unit such that the document conveyance unit is able to be opened and closed with respect to the image reading unit,
wherein the document conveyance unit includes
a first abutment portion configured to abut on the image reading unit, and
a second abutment portion disposed at a position closer to the hinge mechanism than the first abutment portion in a width direction orthogonal to a conveyance direction of a document, and configured to abut on the image reading unit,
wherein the hinge mechanism includes
a first member fixed to the image reading unit,
a first shaft supported by the first member,
a second member configured to rotate on the first shaft with respect to the first member,
a second shaft disposed at a position different from a position of the first shaft and parallel to the first shaft, and supported by the second member,
a third member configured to rotate on the second shaft with respect to the second member, the third member including a first pair of side plates and a first top plate connected to the first pair of side plates at a top side of the first pair of side plates,
a third shaft disposed at a position different from the position of the second shaft and parallel to the second shaft, and supported by the first pair of side plates,
a fourth member to which the document conveyance unit is fixed, and which is configured to rotate on the third shaft with respect to the third member such that the first abutment portion and the second abutment portion abut on the image reading unit, the fourth member including a second pair of side plates and a second top plate connected to the second pair of side plates at a top side of the second pair of side plates, and the fourth member being disposed such that the second top plate is positioned above the first top plate,
a first urging portion that includes a first spring configured to apply torque in a direction in which the document conveyance unit is opened, in accordance with a pivot angle of the document conveyance unit with respect to the image reading unit, and
a second urging portion that includes a second spring configured to apply torque to the fourth member such that the second abutment portion abuts on the image reading unit, and
wherein the second spring is disposed outside the second pair of side plates in an axial direction of the third shaft, below the first top plate, and above a lower edge of the second pair of side plates in a state where the document conveyance unit is closed with respect to the image reading unit.

2. The document reading apparatus according to claim 1,
wherein the third member includes an upper-end pressure receiving portion that extends from the first pair of side plates in the axial direction of the third shaft, and that is configured to engage with an upper end of the second spring and receive an urging force of the second spring, and
wherein the fourth member includes a lower-end pressure receiving portion that extends from the second pair of side plates in the axial direction of the third shaft, and that is configured to engage with a lower end of the second spring and receive the urging force of the second spring.

3. The document reading apparatus according to claim 1,
wherein the first member includes a one-side pressure receiving portion configured to receive an urging force of the first spring applied toward one side of the first spring,
wherein the third member includes an other-side pressure receiving portion configured to receive the urging force of the first spring applied toward an other side of the first spring,
wherein the first urging portion includes
a first support member that is in contact with the one-side pressure receiving portion, that is configured to support an end portion of the first spring on the one side, and that is configured to be slidably supported by the second member, and
a second support member that is in contact with the other-side pressure receiving portion, and that is configured to support an end portion of the first spring on the other side, and
wherein when a pivot angle of the second member with respect to the first member is changed, a distance between the one-side pressure receiving portion and the other-side pressure receiving portion is changed, and the urging force of the first spring is changed, so that the first urging portion applies torque in a direction in which the document conveyance unit is opened in accordance with a pivot angle of the document conveyance unit with respect to the image reading unit.

4. The document reading apparatus according to claim 1,
wherein the fourth member includes an abutment regulation portion configured to abut on the third member and prevent the document conveyance unit from rotating in a case where the document conveyance unit rotates on the third shaft with respect to the third member in a direction in which the document conveyance unit is closed with respect to the image reading unit,
wherein the abutment regulation portion is configured to
abut on the third member and transmit force to the third member for rotating the third member in a case where the document conveyance unit is closed with respect to the image reading unit, and
move away from the third member and allow the third member and the fourth member to move relative to each other, in a case where the fourth member rotates with respect to the third member such that the second abutment portion abuts on the image reading unit.

5. The document reading apparatus according to claim 1, wherein when viewed from the axial direction of the third shaft, the third shaft is disposed opposite to the first shaft with respect to the second shaft.

6. The document reading apparatus according to claim 1, wherein the second pair of side plates includes a first side plate and a second side plate facing the first side plate, wherein the second spring is disposed outside the second pair of side plates on a side of the first side plate in the axial direction of the third shaft, and wherein the second urging portion includes a third spring that is disposed outside the second pair of side plates on a side of the second side plate in the axial direction of the third shaft, and that is configured to apply torque to the fourth member such that the second abutment portion abuts on the image reading unit.

7. The document reading apparatus according to claim 2, wherein the lower-end pressure receiving portion has a shape formed by bending a portion of the second pair of side plates on a first shaft side in the width direction toward an outside of the second pair of side plates in the axial direction of the third shaft.

8. An image forming apparatus comprising:

the document reading apparatus according to claim 1; and an image forming portion configured to form an image that is read by the document reading apparatus on a sheet.

\* \* \* \* \*